(12) United States Patent
He et al.

(10) Patent No.: US 10,595,309 B2
(45) Date of Patent: Mar. 17, 2020

(54) DOWNLINK CONTROL CHANNEL TRANSMISSIONS

(71) Applicant: INTEL IP CORPORATION, Santa Clara, CA (US)

(72) Inventors: Hong He, Sunnyvale, CA (US); Gang Xiong, Portland, OR (US); Hwan-Joon Kwon, Portland, OR (US); Seunghee Han, San Jose, CA (US); Alexei Davydov, Nizhny Novgorod (RU)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 16/094,191

(22) PCT Filed: Mar. 30, 2017

(86) PCT No.: PCT/US2017/025167
§ 371 (c)(1),
(2) Date: Oct. 16, 2018

(87) PCT Pub. No.: WO2017/192224
PCT Pub. Date: Nov. 9, 2017

(65) Prior Publication Data
US 2019/0141679 A1     May 9, 2019

Related U.S. Application Data

(60) Provisional application No. 62/331,740, filed on May 4, 2016.

(51) Int. Cl.
*H04W 72/04* (2009.01)
*H04L 5/00* (2006.01)

(52) U.S. Cl.
CPC ......... *H04W 72/042* (2013.01); *H04L 5/0007* (2013.01); *H04L 5/0053* (2013.01); *H04L 5/0091* (2013.01); *H04W 72/044* (2013.01)

(58) Field of Classification Search
CPC .............. H04W 72/042; H04W 72/044; H04L 5/0007; H04L 5/0053; H04L 5/0091
See application file for complete search history.

(56) References Cited

U.S. PATENT DOCUMENTS

| 2014/0064216 A1* | 3/2014 | Agiwal | H04L 1/0031 370/329 |
| 2017/0290008 A1* | 10/2017 | Tooher | H04L 1/0007 |
| 2018/0115984 A1* | 4/2018 | Sahlin | H04W 72/1268 |

OTHER PUBLICATIONS

Ericsson; "Downlink Control Signaling Design for Short TTI;" 3GPP TSG R1-163322; (Apr. 11-15, 2016); 5 pages; RAN WG1 Meeting #84bis, Busan, Korea; (Agenda 7.3.10.2).

(Continued)

*Primary Examiner* — Duc C Ho
(74) *Attorney, Agent, or Firm* — Thorpe North & Western

(57) ABSTRACT

Technology for a user equipment (UE) operable to identify downlink control channel candidates for receiving downlink control channel information is disclosed. The UE can decode a downlink control information (DCI) format received from an eNodeB. The DCI format can indicate a set of resource blocks (RBs) in one or more subframes allocated for reception or transmission of data or control information in a shortened transmission time interval (S-TTI). The UE can identify a subset of resource elements (REs) within the set of RBs in the one or more subframes. The subset of REs can correspond to shortened physical downlink control channel (S-PDCCH) candidates in the S-TTI of one or more subframes. The UE can attempt to decode the S-PDCCH candidates in the S-TTI of the one or more subframes. S-PDCCH candidates that are successfully decoded can cause the UE to identify the downlink control information.

30 Claims, 17 Drawing Sheets

(56) References Cited

OTHER PUBLICATIONS

Lenovo; "Design of DL Channels for Shortened TTI;" 3GPP TSG R1-162738; (Apr. 11-15, 2016); 5 pages; RAN WG1 Meeting #84b, Busan, Korea; (Agenda 7.3.10.2).
Nokia et al.; "On Design of DL Control Channel for Shorter TTI Operation;" 3GPP TSG R1-163267; (Mar. 11-15, 2016); 5 pages; RAN WG1 Meeting #84bis, Busan, South Korea; (Agenda 7.3.10.2).
Qualcomm Incorporated; "DL Channel Design for Shortened TTI;" 3GPP TSG R1-163068; (Apr. 11-15, 2016); 7 pages; RAN WG1 #84bis, Busan, Korea; (Agenda 7.3.10.2).
International Search Report dated Jul. 21, 2017, in International Application No. PCT/US2017/025167, filed Mar. 30, 2017; 3 pages.

* cited by examiner

| S-REG candidates | Number of S-REGs for one S-CCE $N_{S-REG}^{S-CCE}$ | Number of S-REGs within one PRB, $N_{S-REG}^{RB}$ |
|---|---|---|
| S-REG 400 | 3 | 1 (over 1 OFDM symbol) |
| S-REG 420 | 2 | 1 (over 2 OFDM symbols) |
| S-REG 440 | 6 | 2 (over 1 OFDM symbol) |
| S-REG 480 | 6 | 2 (over 1 OFDM symbol) |

FIG. 5

| Search space $SS_k^{(L)}$ | | | Number of S-PDCCH candidates $M^{(L)}$ | Total candidates for S-TTIs in 1ms |
|---|---|---|---|---|
| S-TTI length | Aggregation level $L$ | Size [in S-CCEs] | | |
| 2-symbols | 1 | 2 | 2 | ~24 |
| | 2 | 4 | 2 | |
| 7-symbols | 1 | 4 | 4 | ~22 |
| | 2 | 8 | 4 | |
| | 4 | 8 | 2 | |
| | 8 | 8 | 1 | |

FIG. 10

DOWNLINK CONTROL CHANNEL TRANSMISSIONS

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in uplink (UL). Standards and protocols that use orthogonal frequency-division multiplexing (OFDM) for signal transmission include the third generation partnership project (3GPP) long term evolution (LTE) Release 8, 9, 10, 11, 12 and 13, the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems (e.g., Release 13 and earlier), the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 5 is a table that includes a number of shortened transmission time interval (S-TTI) resource element groups (S-REGs) per shorted control channel element (S-CCE) in accordance with an example;

FIG. 10 is a table that includes shortened physical downlink control channel (S-PDCCH) candidates monitored by a user equipment (UE) in accordance with an example;

Figure 1:
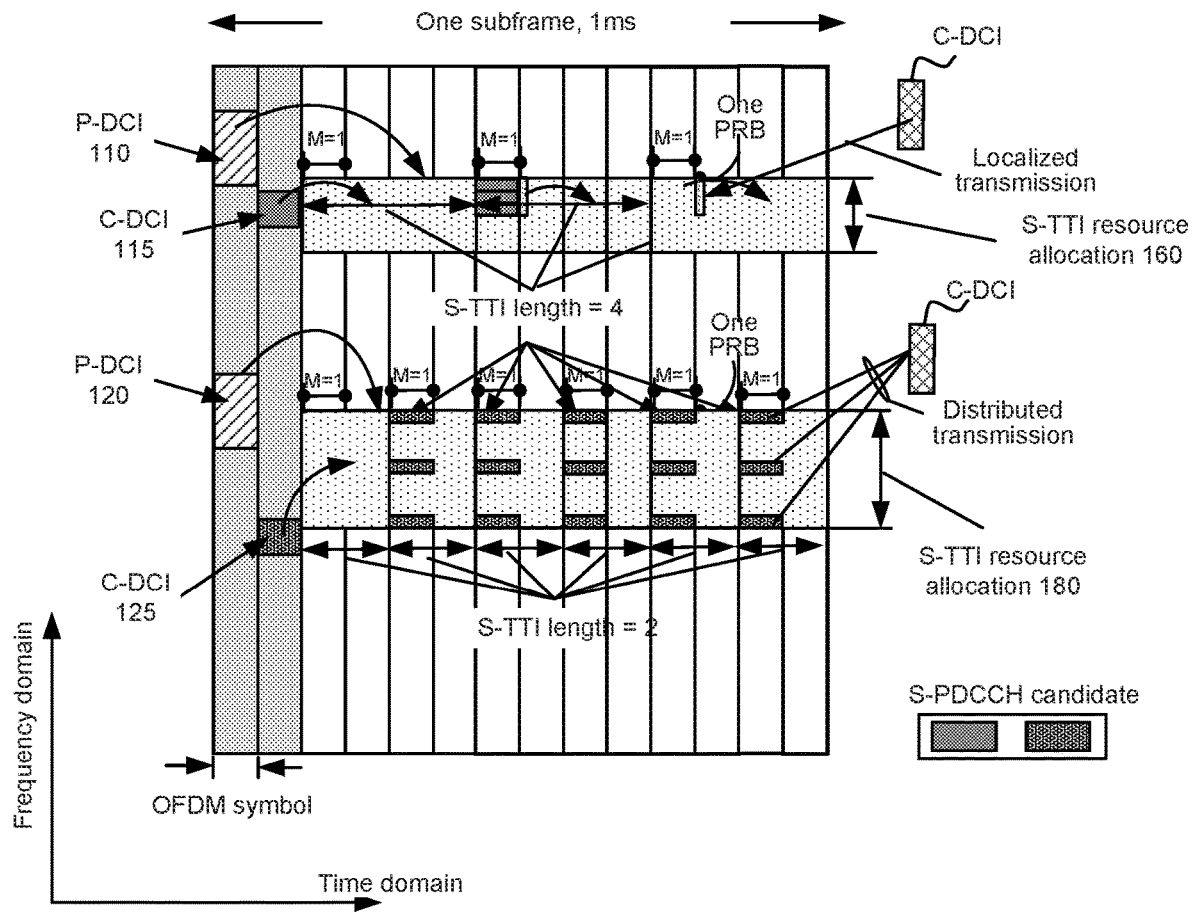
FIG. 1 illustrates a resource set allocation for a shortened transmission time interval (S-TTI) in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Packet data latency is a key performance metric in wireless communication systems. Packet data latency can be important for perceived responsiveness of the wireless communication system. Packet data latency is also a parameter that can influence throughput. Hypertext transfer protocol (HTTP)/transmission control protocol (TCP) is the prevalent application and transport layer protocol suite used on the internet today. A typical size of HTTP/TCP-based transactions over the internet can be in the range of a few tens of kilobytes to one megabyte. In this size range, a TCP slow start period can be a significant portion of a total transport period of a packet stream. Therefore, it is desirable to improve packet data latencies in 3GPP LTE systems within a Release 13 timeframe.

As of 3GPP LTE Release 13, a fixed transmission time interval (TTI) length of 1 millisecond (ms) with 12/14 symbols is defined. The fixed TTI length can balance a tradeoff between signaling overhead and efficiency. A transmission of a request, grant and/or data can be performed in subframe chunks with a TTI. A TTI length can have an impact on an amount of time for transmitting over an air interface, as well as on processing time at the transmitter and receiver. The packet data latency can be reduced with a reduction of transmission time of data and control by shortening a current TTI length (i.e., 1 ms with 12/14 symbols).

In one example, a shorted physical downlink control channel (S-PDCCH) transmission can be supported in a shorted transmission time interval (S-TTI), which can include 2 or 3 symbols. The S-PDCCH transmissions in each S-TTI can function to carry downlink assignment and uplink (UL) grants, such that an eNodeB can schedule a downlink shared channel (DL-SCH) and uplink shared channel (UL-SCH) in a reduced amount of time to meet latency reduction design targets. When designing the S-PDCCH, several factors can be considered and balanced, such as minimizing control signaling overhead while still providing sufficient scheduling flexibility (e.g., allowing multiple UEs scheduling in a single S-TTI).

In the present technology, resource elements can be allocated for a downlink control channel for a shortened TTI (e.g., 2 symbols), which can be referred to as the S-PDCCH. Maximum flexibility can be achieved when sharing time and frequency resources between the S-PDCCH and a shorted physical downlink shared channel (S-PDSCH) thereby improving spectrum efficiency of the S-TTI operations. In the present technology, flexible shortened TTI resource element group (S-REG) based S-PDCCH channel design can support both localized and distributed S-PDCCH resource element (RE) mapping, which can function to achieve frequency diversity or gains from frequency selective scheduling. In the present technology, a S-PDCCH search space can be constructed to reduce a number of blind decoding attempts for detecting a UE allocation, while ensuring properties of multiplexing flexibility. In addition, in the present technology, S-TTI-length-dependent blind decoding attempts can consider several contradict factors, such as UE complexity and an S-PDCCH blocking probability.

In the present technology, techniques are described for allocating a set of time and frequency resources used for shortened PDCCH (S-PDCCH) transmission in one shortened TTI (S-TTI) within a subframe. A parent DCI (P-DCI) can refer to the DCI format transmitted on a legacy PDCCH, and a child DCI (C-DCI) can refer to an associated DCI format transmitted on the S-PDCCH for a corresponding P-DCI format.

FIG. 1 illustrates an example of a resource set allocation for a shortened transmission time interval (S-TTI) in a downlink. An eNodeB can transmit one or more P-DCI formats 110, 120 on a legacy physical downlink control channel (PDCCH) on each subframe (e.g., 1 ms). The eNodeB can transmit the one or more P-DCI formats 110, 120 to a single user equipment (UE) or a group of UEs. One or more C-DCI formats 115, 120 can be associated with the one or more P-DCI formats 110, 120, respectively. The P-DCI formats 110, 120 and the C-DCI formats 115, 120 can be transmitted on different PDCCH channels within the subframe. For example, the PDCCH carrying the P-DCI format 110 and the C-DCI format 115 can be interleaved and then transmitted over two symbols of a DL control region. Alternatively, the location of the C-DCI formats 115 and 120, i.e., on a legacy PDCCH region in a subframe or on a S-PDCCH within a first sTTI in a subframe, can be configured by higher layers for load balancing purpose.

In one example, the P-DCI format 110 and corresponding C-DCI format 115 can be associated with first PDCCH candidates for S-PDSCH scheduling in the first sTTI with a sTTI length of 4 and the P-DCI format 120 and corresponding C-DCI format 125 can be associated with second PDCCH candidates used for S-PDSCH scheduling in the first sTTI with a sTTI length of 2. Control channel elements (CCEs) corresponding to PDCCH candidates for P-DCI(s) can be determined based on a dedicated radio network temporary identifier (RNTI) value assigned by higher layers. The P-DCI formats 110, 120 on the legacy PDCCH region can be identified by different dedicated RNTI values, or alternatively, by a predefined value in a 1-bit information element (IE) field in a DCI format.

In one example, the P-DCI format 110, 120 can include time-frequency radio resource assignment information. A UE can determine an S-TTI resource allocation 160, 180 for a shortened physical downlink shared channel (S-PDSCH) or a shortened physical uplink shared channel (S-PUSCH) and physical resource block (PRB) sets for S-PDCCH monitoring based on the detected P-DCI 110, 120. The S-TTI resource allocation 160 can be associated with an S-TTI length of 4 for S-PDSCH scheduling, and the S-TTI resource allocation 180 can be associated with an S-TTI length of 2 for S-PDSCH scheduling. The resource allocation 160 and 180 can be configured for either localized or distributed transmission. In this example shown in FIG. 1, the S-TTI resource allocation 160 can be configured for a localized transmission, and the S-TTI resource allocation 180 can be configured for a distributed transmission. The S-PDCCH monitoring by the UE can involve attempting to decode each of the S-PDCCH candidates in an S-TTI resource allocation set according to the monitored C-DCI format. In one example, the P-DCI format 110, 120 can additionally include information related to C-DCI 160 and C-DCI 180 such as modulation, code rate, S-PDCCH control size, reference signal (RS) type, etc. In another example, S-TTI resource block (RB) sets may not occupy a full system bandwidth, so that remaining resources can be used for data transmissions for UEs using a legacy TTI length (i.e., 1 ms).

In one configuration, two separate P-DCI formats can be used to indicate a resource block assignment (RBA) for the S-PDSCH and the S-PUSCH in a pair of DL and UL subframes. Alternatively, in order to reduce a DL control signaling overhead, a single P-DCI format can include separate RBA fields or a shared RBA field for S-TTIs in a pair of DL and UL subframes. The DL/UL subframe pair corresponding to a S-TTI band resource allocation can be predefined in the 3GPP LTE specification.

Figure 2:
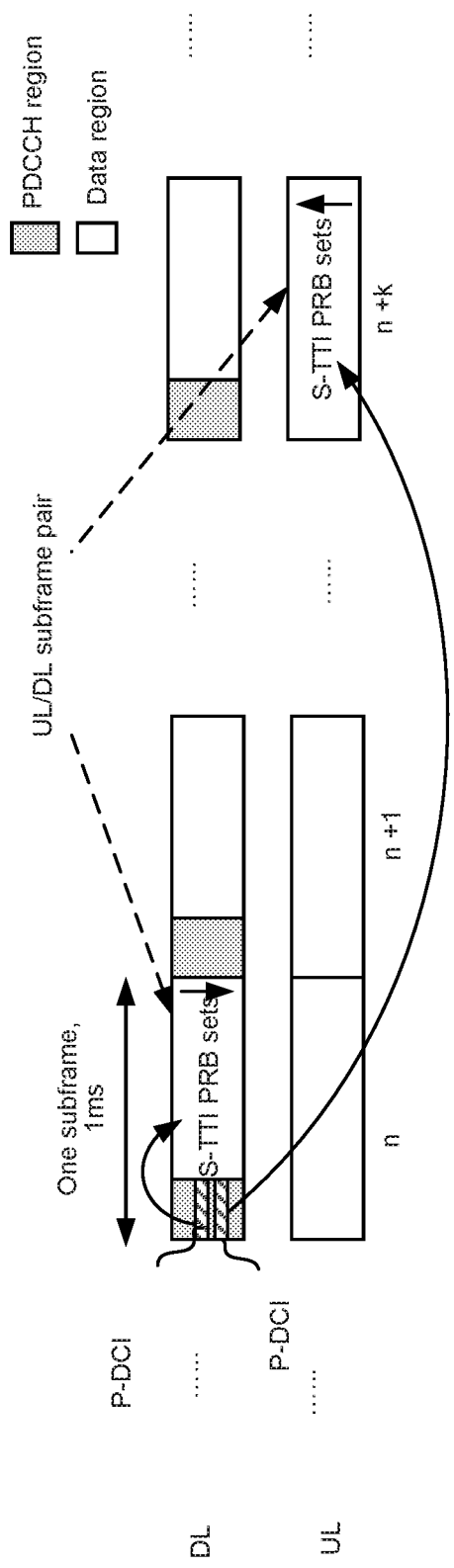
FIG. 2 illustrates a downlink/uplink (DL/UL) subframe pair in accordance with an example.

FIG. 2 illustrates an example of a downlink/uplink (DL/UL) subframe pair. The DL/UL subframe pair can be for shortened transmission time interval (S-TTI) physical resource block (PRB) sets or an S-TTI band allocation operation. In this example, subframe n and n+k (e.g., k=1 or k=4) can be the DL/UL subframe pair, and the S-TTI PRB sets can be used for shortened physical downlink shared channel (S-PDSCH) scheduling. In addition, a shortened physical uplink shared channel (S-PUSCH) transmission in the subframe pair can be allocated by two separate PDCCHs with P-DCI formats (i.e., a first P-DCI format in the DL and a second P-DCI format in the UL), or alternatively, by a single P-DCI format transmitted in a paired DL subframe n.

More specifically, a gap between a DL subframe and the paired UL subframe can be determined based on a legacy UL grant timeline, e.g., 4 subframes, to avoid introducing additional complexity to an eNodeB scheduler.

In one configuration, techniques for S-PDCCH transmission and resource mapping in an S-TTI can be defined. For example, the P-DCI format in subframe n can convey a number of symbols (M) used for the S-PDCCH transmission in the same subframe, where M can be equal to 1 or 2 and the value of M can be changed from subframe to subframe. Alternatively, the number of S-PDCCH symbols period (M) can be fixed (e.g., M=1) corresponding to each S-TTI length, or explicitly configured by higher layer signaling for a given UE. In one example, the number of S-PDCCH symbols M can depend on the S-TTI length configured for a given UE. As an example, M=1, or alternatively, the S-PDCCH can span over all symbols of each S-TTI when the S-TTI length is 1 or 2 or 3. Otherwise, M=2.

Figure 3:
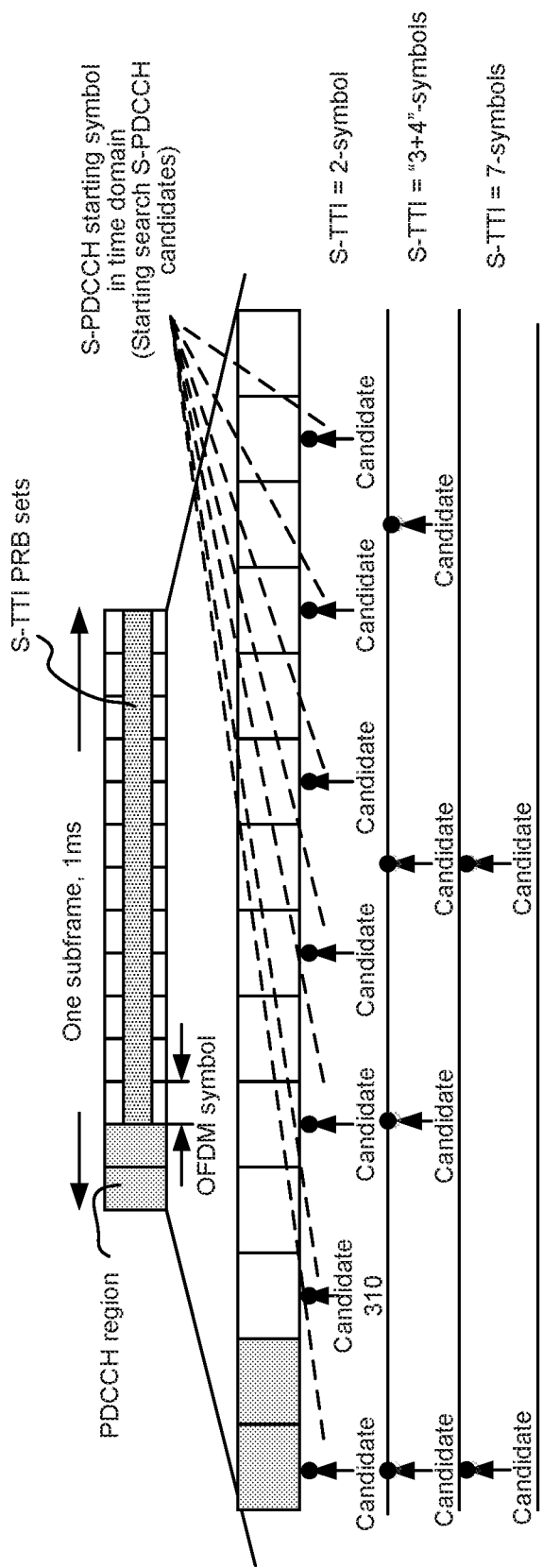
FIG. 3 illustrates shortened physical downlink control channel (S-PDCCH) monitoring in a time domain within a subframe in accordance with an example.

FIG. 3 illustrates an example of shortened physical downlink control channel (S-PDCCH) monitoring in a time domain within a subframe. A user equipment (UE) can determine where to start searching for its DCI for data transmission in a respective sTTI. In one example, a starting OFDM symbol for the S-PDCCH can be implicitly determined based on the number of symbols of the S-TTI. In one example, the UE can monitor the S-PDCCH starting from an OFDM symbol fulfilling $n_{symbol}$ mod $L_{S\text{-}TTI}=0$, wherein $n_{symbol}$ represents an OFDM symbol index within a radio frame and $L_{S\text{-}TTI}$ represents the S-TTI length configured for a given UE. In the example shown in FIG. 3, the S-TTI length can be 2 symbols, 3 or 4 symbols, 7 symbols, etc.

In one example, the UE can monitor S-PDCCH candidates in each even OFDM symbol when the S-TTI length is equal to 2. Alternatively, the $n_{symbol}$ can be indexing from an OFDM symbol that is not used for the PDCCH transmission in a subframe. Then, the $n_{symbol}=0$ corresponding to a third OFDM symbol. Alternatively, the S-PDCCH candidates to be monitored can be configured by higher layers for a single UE.

In one example, the C-DCI used to schedule the S-PDSCH or S-PUSCH transmission in a first S-TTI within a subframe can be configured by higher layers to be transmitted on a legacy PDCCH region, which can avoid introducing control overhead in the S-TTI. Correspondingly, the UE may not monitor the S-PDCCH in the respective DL S-TTIs. For example, an S-PDCCH candidate 310 may not be monitored for the 2-symbol S-TTI case.

In one example, the C-DCI on a legacy control region can be identified at the UE by scrambling its cyclic redundancy check (CRC) bit with a dedicated C-RNTI assigned by higher layers, or by a predefined value in a 1-bit new information element (IE). Alternatively, the location of a C-DCI transmission for scheduling the PDSCH in a first S-TTI can depend on the types of DL RS for S-PDCCH demodulation. For example, the legacy PDCCH region can be used for the C-DCI transmission when CRS is used for S-PDCCH demodulation. For DMRS, the S-PDCCH in a first S-TTI itself can be used for the C-DCI transmission.

In one example, a C-DCI format can be a compact DCI in order to minimize S-PDCCH overhead in the S-TTI. Several predefined resource block allocations (RBAs) can be pre-configured or pre-defined in the 3GPP LTE specification, and only an index field can be signaled to the UE in the C-DCI to indicate the RBAs. As one example, a 2-bit index field in the C-DCI can be used to indicate three resource allocation options, such as $N_{RB}^S$ PRBs, top $N_{RB}^S/2$ PRBs or bottom $N_{RB}^S/2$ PRBs, wherein $N_{RB}^S$ represents a number of PRBs for assigned S-TTI PRB sets. Alternatively, a 3-bit index field in the C-DCI format can be used to indicate eight resource allocation options, such as $N_{RB}^S$ PRBs, first $N_{RB}^S/4$ PRBs, second $N_{RB}^S/4$ PRBs, third $N_{RB}^S/4$ PRBs, or fourth $N_{RB}^S/4$ PRBs, $N_{RB}^S/2$ PRBs or bottom $N_{RB}^S/2$ PRBs. In another example, a bit field in the S-DCI can be used to indicate whether a localized or distributed transmission mode is applied for the S-PDSCH transmission.

In one example, in order to minimize a number of blind decoding operations a 3GPP LTE Release 14 S-TTI UE is to perform, the C-DCI format scheduling the S-PDSCH transmissions and a fast C-DCI format scheduling the S-PUSCH transmissions can be designed to have a same size. Then, a 1-bit differentiation flag can be added into these C-DCI formats to facilitate UE detection.

In one example, the S-PDCCH can be transmitted using an aggregation of one or more S-TTI control channel elements (S-CCEs), where each S-CCE can include multiple S-TTI resource element groups (S-REGs). Multiple S-PDCCHs can be transmitted in an S-TTI to improve spectrum efficiency of the S-TTI operation. In addition, both localized and distributed transmissions can be supported for the S-PDCCH transmission. All S-PDCCH candidates in one S-TTI RB sets can use either localized resources or only distributed resources, as configured by higher layer signaling per UE or dynamically indicated by the P-DCI format transmitted at a start of one subframe.

Figure 4:
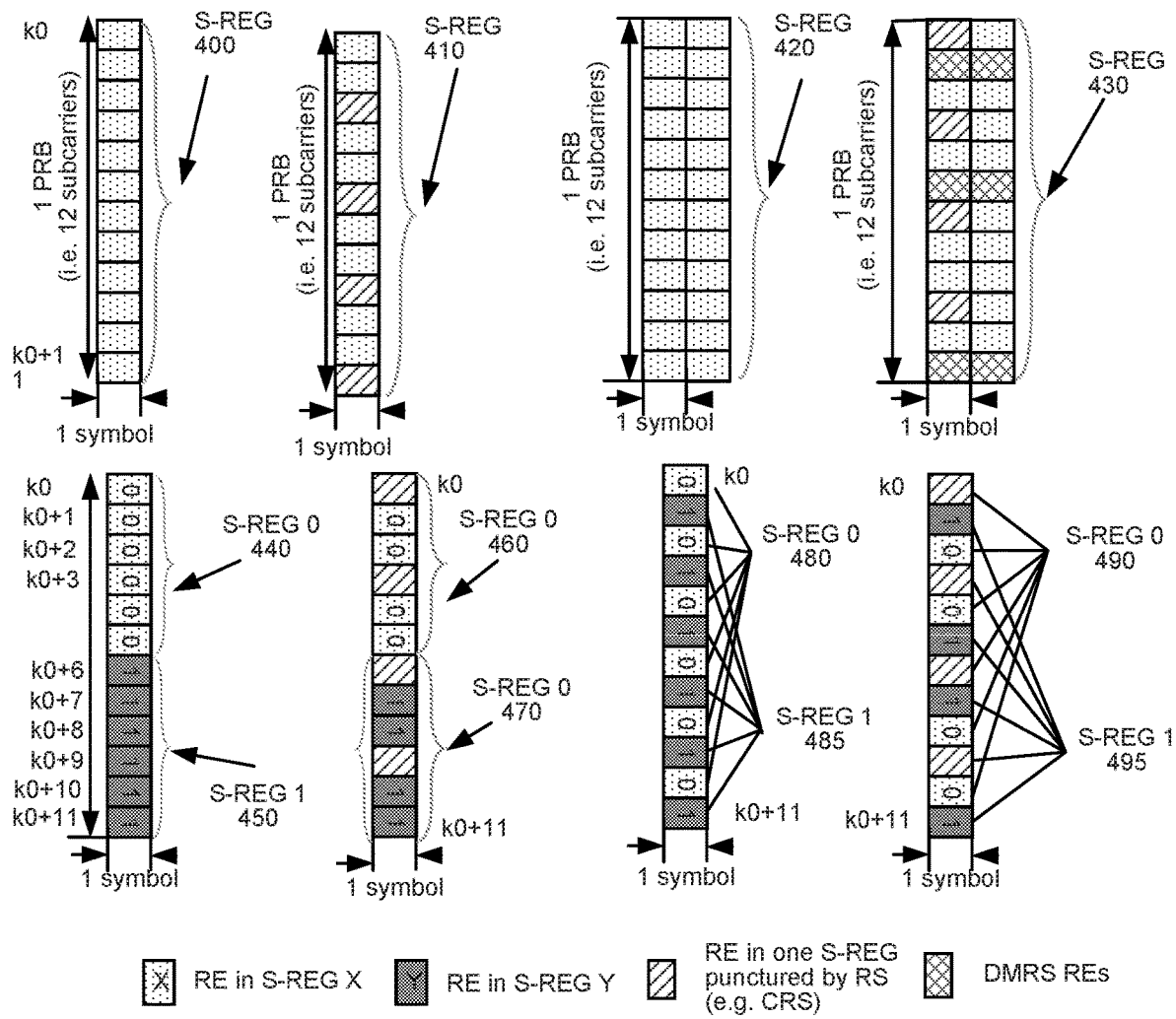
FIG. 4 illustrates shortened transmission time interval (S-TTI) resource element groups (S-REGs) in accordance with an example.

FIG. 4 illustrates an example of shortened transmission time interval (S-TTI) resource element groups (S-REGs). The S-REGs can be used to define a mapping of the S-PDCCH to resource elements (REs). As shown, the S-REGs can include REs in S-REG X, REs in S-REG Y, REs in one S-REG punctured by a reference signal (RS) (e.g., CRS), or DMRS REs.

In one example, all REs except REs carrying a DMRS within one PRB in one OFDM symbol can constitute one S-REG 400 in an increasing order of frequency. One S-REG can span over one RB. In addition, a number of S-REGs used for one S-CCE (e.g., which is denoted by $N_{S\text{-}REG}^{S\text{-}CCE}$) can be equal to 3. In this example, the S-REG 400 can include only REs in S-REG X, whereas an S-REG 410 can include REs in S-REG X and REs in one S-REG punctured by an RS.

In one example, all REs except REs carrying a DMRS within one PRB in two consecutive OFDM symbols can constitute one S-REG 420. A mapping to REs within one S-REG can be performed in an increasing order of first in a subcarrier index, and then in a time domain. Corresponding to the S-REG 420, $N_{S\text{-}REG}^{S\text{-}CCE}=2$. In one example, frequency hopping can be applied for the S-PDCCH transmission in two OFDM symbols. A frequency hopping distance for the S-PDCCH transmission in two symbols can be predefined in the 3GPP LTE specification or configured by higher layers. The frequency hopping distance can also be defined as a function of a resource allocation size for a corresponding S-PDSCH transmission. In this example, the S-REG 420 can include only REs in S-REG X, whereas an S-REG 430 can include REs in S-REG X, REs in one S-REG punctured by an RS and DMRS REs.

In one example, an S-REG 440 can include REs k within one OFDM symbol with k=$k_0$+0, $k_0$+1, . . . , $k_0$+5 and another S-REG 450 can include REs k within one OFDM symbol with k=$k_0$+6, $k_0$+7, . . . , $k_0$+11, respectively, wherein k0 is a first RE in a frequency index in a PRB. In this example, the S-REG 440 can include only REs in S-REG X, whereas the S-REG 450 can include only REs in S-REG Y. In another example, an S-REG 460 can include REs in S-REG X and REs in one S-REG punctured by an RS, and an S-REG 470 can include REs in S-REG Y and DMRS REs.

In one example, an S-REG 480 can include even REs k (i.e., frequency index) within one OFDM symbol with $k=k_0+0, k_0+2, \ldots, k_0+10$ and another S-REG 485 can include odd REs k within one OFDM symbol with $k=k_0+1, k_0+7, \ldots, k_0+11$, respectively. In this example, the S-REG 480 can include REs in S-REG X, and S-REG 485 can include REs in S-REG Y. In another example, an S-REG 490 can include REs in S-REG X and REs in one S-REG punctured by an RS, and an S-REG 495 can include REs in S-REG Y and REs in one S-REG punctured by an RS.

In one example, to avoid performance degradation due to the puncturing of legacy LTE signals in an S-TTI, including cell specific reference signal (CRS), zero power (ZP) channel state information reference signal (CSI-RS) or nonzero power (NZP) CSI-RS, a block of encoded DCI symbols can be mapped to available REs of assigned S-REGs, which can be assumed by the UE to not to be used for CRS/ZP-CSI-RS/NZP-CSI-RS. For example, an actual number of REs in the S-REG 410, 430, 460/470 or 490/495 used for DCI symbols mapping can be reduced due to CRS puncturing, as compared to the S-REG 400, 420, 440/450 or 480/485.

FIG. 5 is an exemplary table that includes a number of shortened transmission time interval (S-TTI) resource element groups (S-REGs) per shorted control channel element (S-CCE). A number of S-REGs per S-CCE ($N_{S-REG}^{S-CCE}$) can correspond to different S-REG structures. In general, one S-CCE can be composed of 36 REs or 48 REs over 1 or 2 OFDM symbols.

As shown in FIG. 5, for a first S-REG candidate (e.g., S-REG 400), a number of S-REGs for one S-CCE ($N_{S-REG}^{S-CCE}$) can be 3, and a number of S-REGs within one PRB ($N_{S-REG}^{RB}$) can be 1 (over 1 OFDM symbol). For a second S-REG candidate (e.g., S-REG 420), a number of S-REGs for one S-CCE ($N_{S-REG}^{S-CCE}$) can be 2, and a number of S-REGs within one PRB ($N_{S-REG}^{RB}$) can be 1 (over 2 OFDM symbols). For a third S-REG candidate (e.g., S-REG 460), a number of S-REGs for one S-CCE ($N_{S-REG}^{S-CCE}$) can be 6, and a number of S-REGs within one PRB ($N_{S-REG}^{RB}$) can be 2 (over 1 OFDM symbol). For a fourth S-REG candidate (e.g., S-REG 480), a number of S-REGs for one S-CCE ($N_{S-REG}^{S-CCE}$) can be 6, and a number of S-REGs within one PRB ($N_{S-REG}^{RB}$) can be 2 (over 1 OFDM symbol).

In one configuration, for a localized transmission, an S-CCE number n can correspond to S-REGs in $N_{S-REG}^{S-CCE}$ consecutive PRB indices within S-TTI RB sets starting from a PRB $N_{RB}^{(0)}+n \times N_{S-REG}^{S-CCE}$, where $N_{RB}^{(0)}$ is a starting PRB within the allocated S-TTI PRB sets. For a distributed transmission, an S-CCE number n can correspond to S-REGs in a PRB numbered with $N_{RB}^{(0)}+n+j \times \lceil N_{RB}^{S}/N_{S-REG}^{S-CCE} \rceil$, where $j=0, \ldots, N_{S-REG}^{S-CCE}-1$, and $N_{RB}$ can be a total number of RBs allocated for an S-TTI PRB set.

Figure 6:
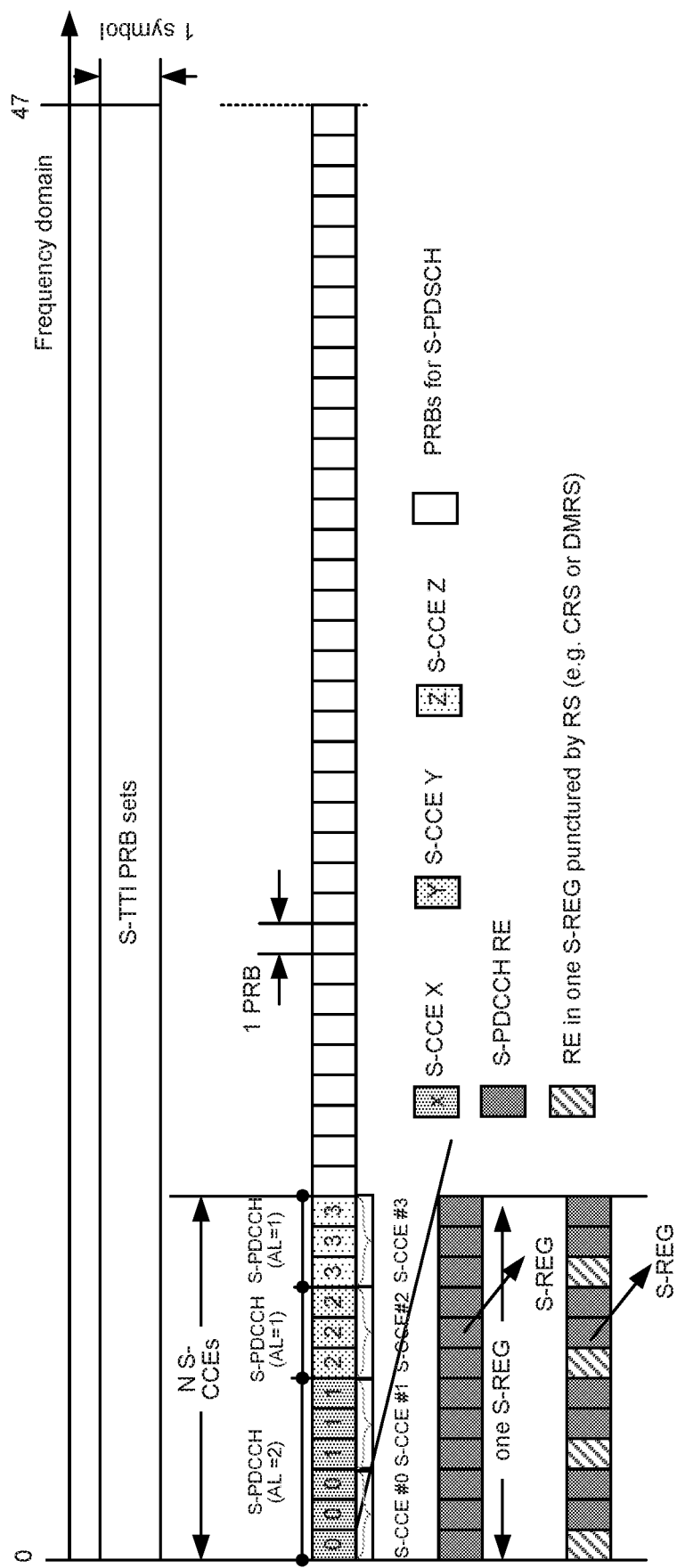
FIG. 6 illustrates a localized shortened physical downlink control channel (S-PDCCH) resource mapping in accordance with an example.

FIG. 6 illustrates an example of a localized shortened physical downlink control channel (S-PDCCH) resource mapping. In this example, three S-PDCCH transmissions can be performed in a localized manner with a certain S-REG structure. In this example, $N_{RB}^{(0)}=0$, $N_{RB}^{S}=48$, $N_{S-REG}^{S-CCE}=3$. In this example, within a span of N S-CCEs, there can be first S-PDCCH resources (AL=2) that correspond to S-CCE X, second S-PDCCH resources (AL=1) that correspond to S-CCE Y, and third S-PDCCH resources (AL=1) that correspond to S-CCE Z. In this example, within one S-REG, there can be S-PDCCH REs and REs in one S-REG that are punctured by an RS (e.g., CRS or DMRS). The first S-PDCCH resources, the second S-PDCCH resources and the third S-PDCCH resources can be mapped in a localized manner, and this can be followed by PRBs for the S-PDSCH.

In one example, the RBs in the S-TTI RBs sets can be non-contiguous. In addition, the $N_{RB}^{S}$ S-TTI RB sets can be illustrated in a logic manner instead of a physical resource manner.

Figure 7:
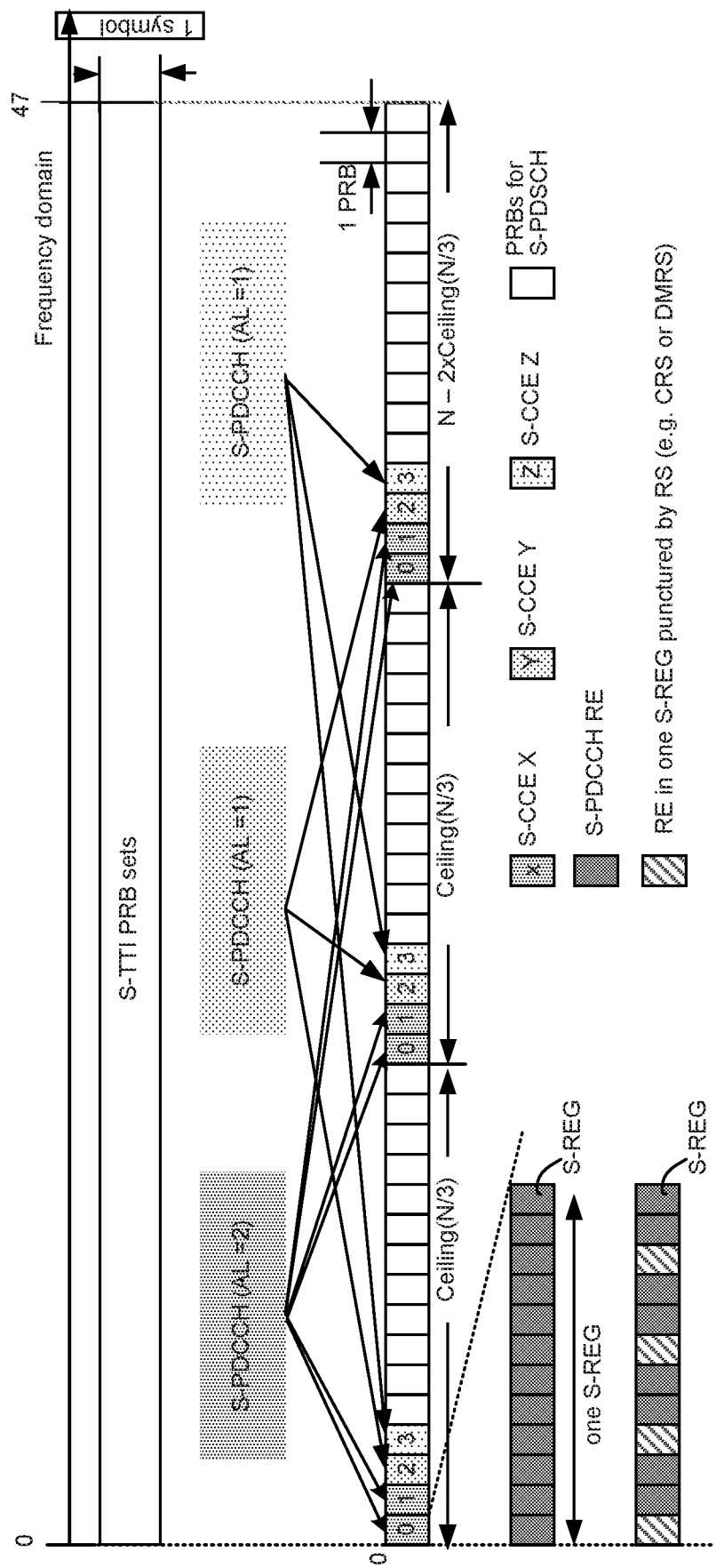
FIG. 7 illustrates a distributed shortened physical downlink control channel (S-PDCCH) resource mapping in accordance with an example.

FIG. 7 illustrates an example of a distributed shortened physical downlink control channel (S-PDCCH) resource mapping. In this example, three S-PDCCH transmissions can be performed in a distributed manner with a certain S-REG structure. In this example, $N_{RB}^{(0)}=0$, $N_{RB}^{S}=48$, $N_{S-REG}^{S-CCE}=3$. In this example, within a given span of S-CCEs (e.g., N/3), there can be first S-PDCCH resources (AL=2) that correspond to S-CCE X, second S-PDCCH resources (AL=1) that correspond to S-CCE Y, and third S-PDCCH resources (AL=1) that correspond to S-CCE Z. In this example, within one S-REG, there can be S-PDCCH REs and REs in one S-REG that are punctured by an RS (e.g., CRS or DMRS). The first S-PDCCH resources, the second S-PDCCH resources and the third S-PDCCH resources can be mapped in a distributed manner, and each given span can include PRBs for the S-PDSCH.

In one example, for a given S-REG structure (e.g., S-REG 440/450 or S-REG 480/485), the S-CCE number n can corresponds to S-REGs numbered (n mod $N_{S-REG}^{RB}$)+ $jN_{S-REG}^{RB}$ in a PRB index $(k+n \times N_{S-REG}^{S-CCE}/N_{S-REG}^{RB}+N_{RB}^{(0)})$ for localized mapping, and S-REGs numbered (n mod $N_{S-REG}^{RB}$) in PRB indices $N_{RB}^{(0)}+n+l \times \lceil N_{RB}^{S}/N_{S-REG}^{S-CCE} \rceil$ for distributed mapping, where $j=0, \ldots, N_{S-REG}^{RB}-1$, $k=0, 1, \ldots N_{S-REG}^{S-CCE}/N_{S-REG}^{RB}-1$, $l=0, 1, \ldots, N_{S-RG}^{S-CCE}-1$, $N_{RB}^{S}$ is a total number of RBs allocated for an S-TTI PRB set, and $N_{S-REG}^{RB}$ is a number of S-REGs within a single RB. As an example, $N_{S-REG}^{RB}=2$ for the given S-REG structure (e.g., S-REG 440/450 or S-REG 480/485).

In one configuration, a search space definition for the S-PDCCH can be defined that allows for the creation of scheduling options for UEs that utilize both localized mapping and distributed mapping. For example, an S-PDCCH specific search space $SS_k^{(L)}$ at aggregation level e.g., $L \in \{1, 2, 4, 8\}$ or a subset can be defined by a set of S-PDCCH candidates, numbered from 0 to $N_{S-CCE,k}-1$, where $N_{S-CCE,k}$ is a total number of S-CCEs in the S-PDCCH of S-TTI k. The UE can monitor a set of S-PDCCH candidates to decode each of the PDCCHs in the set according to the monitored DCI formats.

In one example, with respect to a search space design, a single common S-PDCCH search space can be defined and shared by different UEs. In another example, the S-CCEs corresponding to S-PDCCH candidate m of the search space at aggregation level L can be given by: $L\{m \bmod \lfloor N_{S-CCE,k}/L \rfloor\}+i$, wherein $i=0, \ldots, L-1$; $m=0, 1, \ldots M^{(L)}-1$, and $M^{(L)}$ represents a number of S-PDCCH candidates to monitor at aggregation level L.

Figure 8:
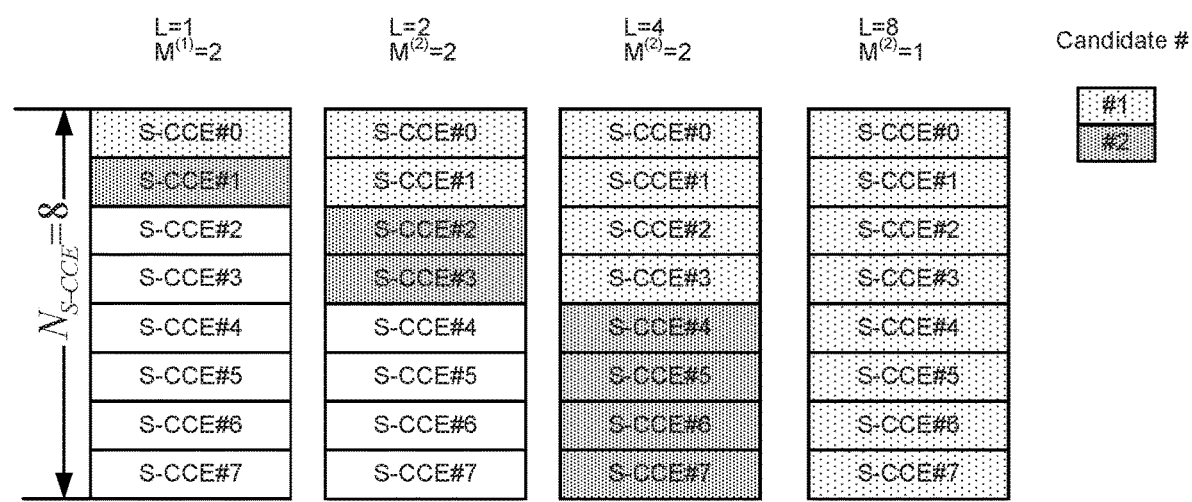
FIG. 8 illustrates a shared shortened physical downlink control channel (S-PDCCH) search space design in accordance with an example.

FIG. 8 illustrates an example of a shared shortened physical downlink control channel (S-PDCCH) search space design. For an S-TTI RB set, S-CCEs corresponding to S-PDCCH candidate m of the S-PDCCH specific search space $SS_k^{(L)}$ can be given by: $L\{(Y_k+m) \bmod \lfloor N_{S-CCE,k}/L \rfloor\}+i$, wherein $i=0, \ldots, L-1$; $m=0, 1, \ldots M^{(L)}-1$, and $M^{(L)}$ represents a the number of S-PDCCH candidates to monitor at aggregation level L in the S-TTI RB set. In one example, the variable $Y_k$ can be defined by: $Y_k=(A \cdot Y_{k-1}) \bmod D$, wherein $Y_{-1}=n_{RNTI} \neq 0$, $A=39827$, $D=65537$ and k is an S-TTI index within a subframe. In one example, one DCI format for DL and one DCI format for UL can be configured for a UE, e.g., based on transmission modes. More specifically, zeros can be appended to one DCI format with reduced information bits until a payload size equals to that of the other DCI format.

In the example shown in FIG. 8, for an aggregation level L of 1 and $M^{(1)}=2$, a first S-PDCCH candidate can correspond to S-CCE #0 and a second S-PDCCH candidate can correspond to S-CCE #1. When the aggregation level L is 2 and $M^{(2)}=2$, the first S-PDCCH candidate can correspond to S-CCE #0-1 and the second S-PDCCH candidate can correspond to S-CCE #2-3. When the aggregation level L is 4 and $M^{(2)}=2$, the first S-PDCCH candidate can correspond to S-CCE #0-3 and the second S-PDCCH candidate can correspond to S-CCE #4-7. When the aggregation level L is 8 and $M^{(2)}=1$, the first S-PDCCH candidate can correspond to S-CCE #0-7.

Figure 9:
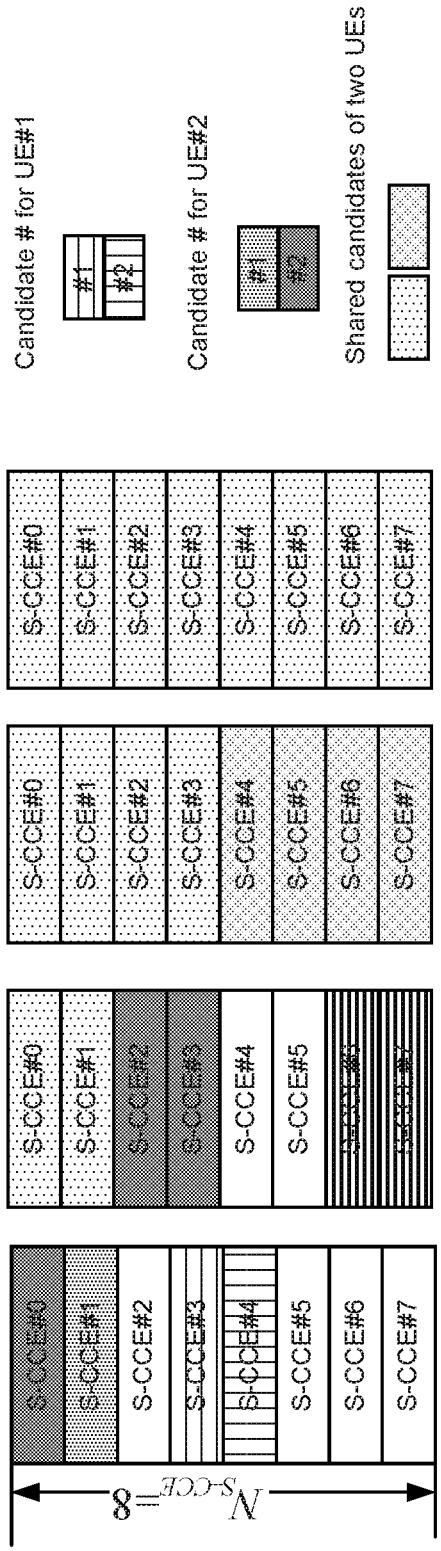
FIG. 9 illustrates a user equipment (UE)-specific shortened physical downlink control channel (S-PDCCH) search space design in accordance with an example.

FIG. 9 illustrates an example of a user equipment (UE)-specific shortened physical downlink control channel (S-PDCCH) search space design. As shown, search space candidates can be defined for UE #1 ($n_{RNTI}=0001$) and UE #2 ($n_{RNTI}=0003$) in an S-TTI index 0 within a subframe. In this example, a first search space candidate for UE #1 can correspond to S-CCE #3 for an aggregation level L of 1 and S-CCE #6-7 for an aggregation level L of 2. A second search space candidate for UE #1 can correspond to S-CCE #4 for an aggregation level L of 1. In addition, a first search space candidate for UE #2 can correspond to S-CCE #1 for an aggregation level L of 1, and a second search space candidate for UE #2 can correspond to S-CCE #0 for an aggregation level L of 1 and S-CCE #2-3 for an aggregation level L of 2. When an aggregation level L is 4 or 8, the S-CCEs can correspond to shared candidates of two UEs.

In one example, in order to maintain a total number of blind decoding candidates in a legacy subframe (i.e., 1 ms) irrespective of the S-TTI length, the number of aggregation levels (AL) and/or the number of S-PDCCH candidates corresponding to a given AL can be S-TTI length dependent. In one example, the number of aggregation level and/or number of S-PDCCH candidates corresponding to a 2-symbol S-TTI length at a single instance (or PDCCH candidate) can be reduced as compared to a slot-based S-TTI that has an increased number of OFDM symbols.

FIG. 10 is an exemplary table that includes shortened physical downlink control channel (S-PDCCH) candidates monitored by a user equipment (UE). The table includes an aggregation level example and defines the common S-PDCCH search space for different S-TTI lengths. As shown in FIG. 10, for an S-TTI length of 2 symbols, the common S-PDCCH search space ($SS_k^{(L)}$) can include a defined aggregation level L (e.g., 1 or 2), a defined size (in S-CCEs) (e.g., 2 or 4), a defined number of S-PDCCH candidates $M^{(L)}$ (e.g., 2), and a defined total number of candidates for S-TTIs in 1 ms (e.g., approximately 24). Similarly, for an S-TTI length of 7 symbols, the common S-PDCCH search space ($SS_k^{(L)}$) can include a defined aggregation level L (e.g., 1, 2, 4 or 8), a defined size (in S-CCEs) (e.g., 4 or 8), a defined number of S-PDCCH candidates $M^{(L)}$ (e.g., 1, 2 or 4), and a defined total number of candidates for S-TTIs in 1 ms (e.g., approximately 22).

In one example, the number of aggregation levels and/or the number of S-PDCCH candidates to monitor at a given aggregation level L can be configured by higher layer signaling for each UE or dynamically signaled by the P-DCI format transmitted in a same subframe, which can reduce a number of blind decoding attempts for C-DCI format detection while ensuring sufficient multiplexing flexibility.

In one example, the UE can skip monitoring the S-PDCCH candidates in subframe n when the UE does not receive a valid P-DCI format with a CRC scrambled by a dedicated RNTI configured by higher layers (e.g., S-RNTI), or when a DCI format used for scheduling a legacy PDSCH or PUSCH has been detected for the same subframe.

In one example, the UE can determine a size of the S-PDCCH candidates for the S-PDSCH reception. In one example, the $N_{S-CCE}$ value or an index of the $N_{S-CCE}$ value can be signaled on a subframe basis using the P-DCI format, or on a per S-TTI basis using the C-DCI format. The number of S-CCEs can be limited to $N_{S-CCE}$. Alternatively, the number of S-CCEs can be fixed and correspond to the S-TTI lengths, or the number of S-CCEs can be configured by higher layers for the UEs. The UE can ascertain the number of S-PDCCHs in the control based on a control signal that indicates the number of S-PDCCHs, e.g., the P-DCI format or C-DCI format. In addition, the UE assume that the REs not assigned to the reserved $N_{S-CCE}$ can be used for an S-PDSCH rate-matching operation.

In one configuration, techniques for determining a reference signal (RS) type used for S-PDCCH demodulation can be defined. For example, the type of reference signaling used for S-PDCCH demodulation (i.e., cell-specific reference signal (CRS) or demodulation reference signal (DMRS)) in one subframe can be configured by higher layers for an individual UE or indicated by the P-DCI format for one individual UE or a group of UEs. In one example, the type of reference signaling used for S-PDCCH demodulation can be determined based on the S-TTI length. More specifically, a DMRS presence in the S-TTI can be dynamically indicated by the C-DCI format. For example, the DMRS may be not present in one S-TTI k when a S-PDSCH with DMRS has been scheduled in S-TTI k−1, such that RS overhead has been reduced.

In one example, CRS-based S-PDCCH can be used when the S-TTI length is less than one slot due to a limited symbol number in the S-TTI. CRS-based and/or DMRS-based S-PDCCH can be configurable for slot-based S-TTI length in order to achieve beamforming gain with increased RS overhead. In one example, the DMRS can always be used for S-PDCCH demodulation in a non-multicast-broadcast single-frequency network (MBSFN) region of a MBSFN subframe due to a lack of CRS.

In one example, DMRS can be applied only for the S-TTI without a presence of CRS, either based on signaling (e.g., higher layers or P-DCI format) or fixed in the 3GPP LTE specification. In one example, a duration of the S-PDSCH and S-PUSCH for a particular UE can be configured by higher layers (e.g., via a radio resource control (RRC) message) or dynamically indicated by a corresponding P-DCI format with a same or different value. In addition, the duration of the S-PUCCH and S-PUSCH for a UE can be configured with different values, while taking into account different performance constraints.

In one configuration, one or more control channel candidates can be identified for receiving downlink control information in a wireless communication system. For example, a user equipment (UE) can receive a downlink control information (DCI) format indicating a number of resource blocks (RBs) in one or more subframes allocated for shortened TTI (S-TTI) data reception or transmission. The UE can identify shortened physical downlink control channel (S-PDCCH) candidates in each shortened TTI from a subset of resource elements (REs) within the RBs. The UE can decode identified S-PDCCH candidates in order to receive the downlink control information.

In one example, the DCI format can include time-frequency radio resource assignment information. In one example, the DCI format can include information related to modulation, code rate, S-PDCCH control size, reference signal (RS) type, etc. In one example, the DCI format can be transmitted on a legacy PDCCH region to a single UE or a group of UEs. The DCI format can be identified by a dedicated radio network temporary identity (RNTI) value, or alternatively, by a predefined value in a 1-bit information element (IE) field in the DCI format.

In one example, the UE can identify the subset of REs by: determining a starting symbol(s) and a number of orthogonal frequency-division multiplexing (OFDM) symbols used for a S-PDCCH transmission, grouping a subset of REs in the determined symbols to constitute shortened TTI resource element groups (S-REGs); grouping a set of S-REGs to constitute one more S-TTI control channel elements (S-CCEs), and aggregating the one or more S-CCEs for the S-PDCCH transmission.

In one example, the starting symbols of the S-PDCCH transmission can be implicitly determined based on a number of symbols in the S-TTI or configured by higher-layers signaling. In one example, the number of OFDM symbols used for the S-PDCCH transmission can be: signaled by the DCI format, hard-coded in the 3GPP specification, configured by higher layers, or depend on a UE-specific S-TTI length.

In one example, the S-CCE can include 3 S-REGs, and each S-REG can include all REs except REs carrying a demodulation reference signal (DMRS) within one physical resource block (PRB) in one OFDM symbol in an increasing order of frequency. In one example, the S-CCE can include 2 S-REGs and each S-REG can include all REs except REs carrying a DMRS within one PRB in two consecutive OFDM symbols. In one example, the S-CCE can include 6 S-REGs, and each S-REG can include 6 REs.

In one example, one S-REG can include REs k within one OFDM symbol with $k=k_0+0, k_0+1, \ldots, k_0+5$, wherein $k_0$ is a first RE in a frequency index in a PRB. In one example, one S-REG can include REs k within one OFDM symbol with $k=k_0+6, k_0+7, \ldots, k_0+11$. In one example, one S-REG can include even REs k (e.g., frequency index) within one OFDM symbol with $k=k_0+0, k_0+2, \ldots, k_0+10$. In one example, one S-REG can include odd REs k within one OFDM symbol with $k=k_0+1, k_0\pm7, \ldots, k_0+11$.

In one example, a block of encoded DCI symbols can be mapped to available REs of assigned S-REGs, which can be assumed by the UE to not be used for a cell specific reference signal (CRS) or zero power (ZP) channel state information reference signal (CSI-RS) or nonzero power (NZP) CSI-RS.

In one example, the S-CCE number n can correspond to S-REGs in $N_{S-REG}^{S-CCE}$ consecutive PRB indices starting from a PRB $N_{RB}^{(0)}+n\times N_{S-REG}^{S-CCE}$, wherein $N_{RB}^{(0)}$ is a starting PRB within allocated S-TTI PRB sets and $N_{S-REG}^{S-CCE}$ represents a number of S-REGs per S-CCE. In one example, the S-CCE number n can correspond to S-REGs in a PRB numbered with $N_{RB}^{(0)}+n+j\times\lceil N_{RB}^{S}/N_{S-REG}^{S-CCE}\rceil$, wherein $j=0, \ldots, N_{S-REG}^{S-CCE}-1$; and $N_{RB}^{S}$ is a total number of RBs for an allocated S-TTI PRB set and $N_{S-REG}^{S-CCE}$ represents a number of S-REGs per S-CCE. In one example, the S-CCE number n can correspond to S-REGs numbered (n mod $N_{S-REG}^{RB}$)+$jN_{S-RG}^{RB}$ in a PRB index $(k+n\times N_{S-REG}^{S-CCE}/N_{S-REG}^{RB}+N_{RB}^{(0)})$. In one example, the S-CCE number n can correspond to S-REGs numbered (n mod $N_{S-REG}^{RB}$) in PRB indices $N_{RB}^{(0)}+n+l\times\lceil N_{RB}^{S}/N_{S-REG}^{S-CCE}\rceil$.

In one example, the S-PDCCH candidates can be determined as the S-CCEs corresponding to a S-PDCCH candidate m of a search space at aggregation level L, given by: $L\{m \bmod \lfloor N_{S-CCE,k}/L\rfloor\}+i$, wherein $i=0, \ldots, L-1$; $m=0, 1, \ldots M^{(L)}-1$ and $M^{(L)}$ is a number of S-PDCCH candidates to monitor at aggregation level L. In one example, the S-PDCCH candidates can be determined as the S-CCEs corresponding to a S-PDCCH candidate m of a S-PDCCH specific search space $SS_k^{(L)}$, which can be given by: $L\{(Y_k+m)\bmod \lfloor N_{S-CCE,k}/L\rfloor\}+i$, wherein $i=0, \ldots, L-1$; $m=0, 1, \ldots M^{(L)}-1$. Here, $M^{(L)}$ is a number of S-PDCCH candidates to monitor at aggregation level L in an S-TTI RB set. The variable $Y_k$ can be defined by: $Y_k=(A\cdot Y_{k-1}) \bmod D$, wherein $Y_{-1}=n_{RNTI}\neq 0, A=39827, D=65537$ and k is a S-TTI index within a subframe.

In one example, a number of aggregation levels and/or a number of S-PDCCH candidates to monitor at a given aggregation level L by the UE can be configured by higher layer signaling for each UE, or can be dynamically signaled by the P-DCI format transmitted in the same subframe.

Figure 11:
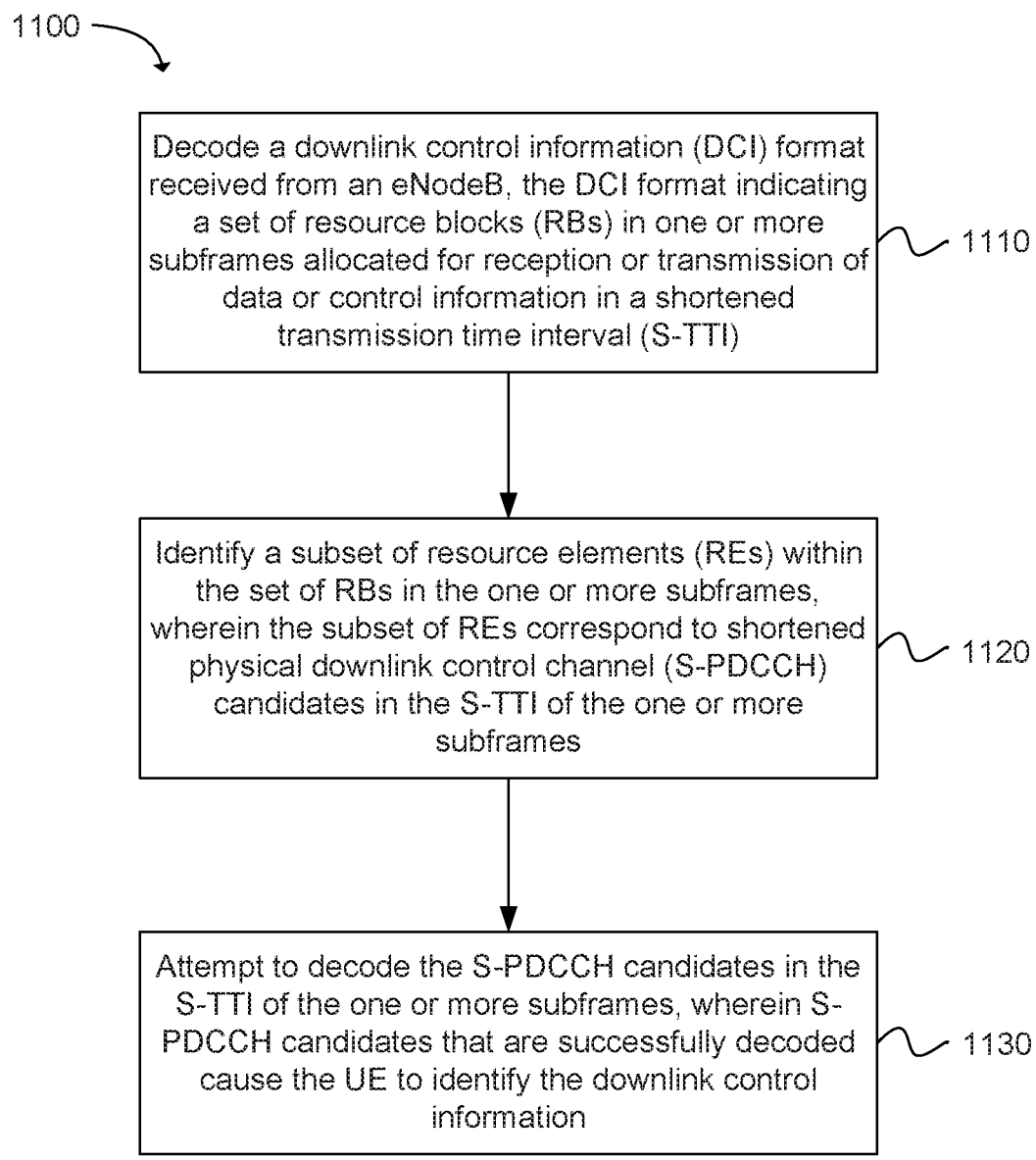
FIG. 11 depicts functionality of a user equipment (UE) operable to identify downlink control channel candidates for receiving downlink control information in accordance with an example.

Another example provides functionality 1100 of a user equipment (UE) operable to identify downlink control channel candidates for receiving downlink control information, as shown in FIG. 11. The UE can comprise memory and one or more processors. The one or more processors can be configured to decode a downlink control information (DCI) format received from an eNodeB, the DCI format indicating a set of resource blocks (RBs) in one or more subframes allocated for reception or transmission of data or control information in a shortened transmission time interval (S-TTI), as in block 1110. The one or more processors can be configured to identify a subset of resource elements (REs) within the set of RBs in the one or more subframes, wherein the subset of REs correspond to shortened physical downlink control channel (S-PDCCH) candidates in the S-TTI of the one or more subframes, as in block 1120. The one or more processors can be configured to attempt to decode the S-PDCCH candidates in the S-TTI of the one or more subframes, wherein S-PDCCH candidates that are successfully decoded cause the UE to identify the downlink control information, as in block 1130.

Figure 12:
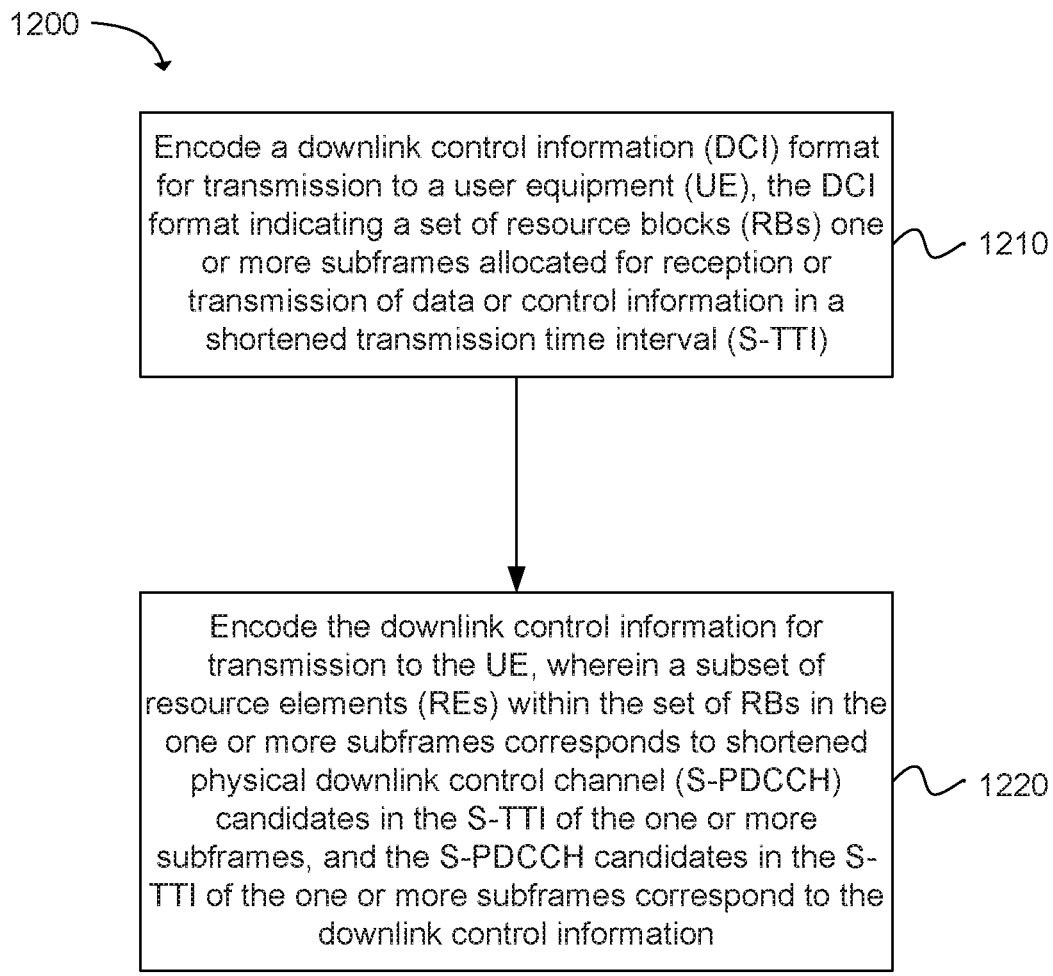
FIG. 12 depicts functionality of an eNodeB operable to provide downlink control information in accordance with an example.

Another example provides functionality 1200 of an eNodeB operable to provide downlink control information, as shown in FIG. 12. The eNodeB can comprise memory and one or more processors. The one or more processors can be configured to encode a downlink control information (DCI) format for transmission to a user equipment (UE), the DCI format indicating a set of resource blocks (RBs) one or more subframes allocated for reception or transmission of data or control information in a shortened transmission time interval (S-TTI), as in block 1210. The one or more processors can be configured to encode the downlink control information for transmission to the UE, wherein a subset of resource elements (REs) within the set of RBs in the one or more subframes corresponds to shortened physical downlink control channel (S-PDCCH) candidates in the S-TTI of the one or more subframes, and the S-PDCCH candidates in the S-TTI of the one or more subframes correspond to the downlink control information, as in block 1220.

Figure 13:
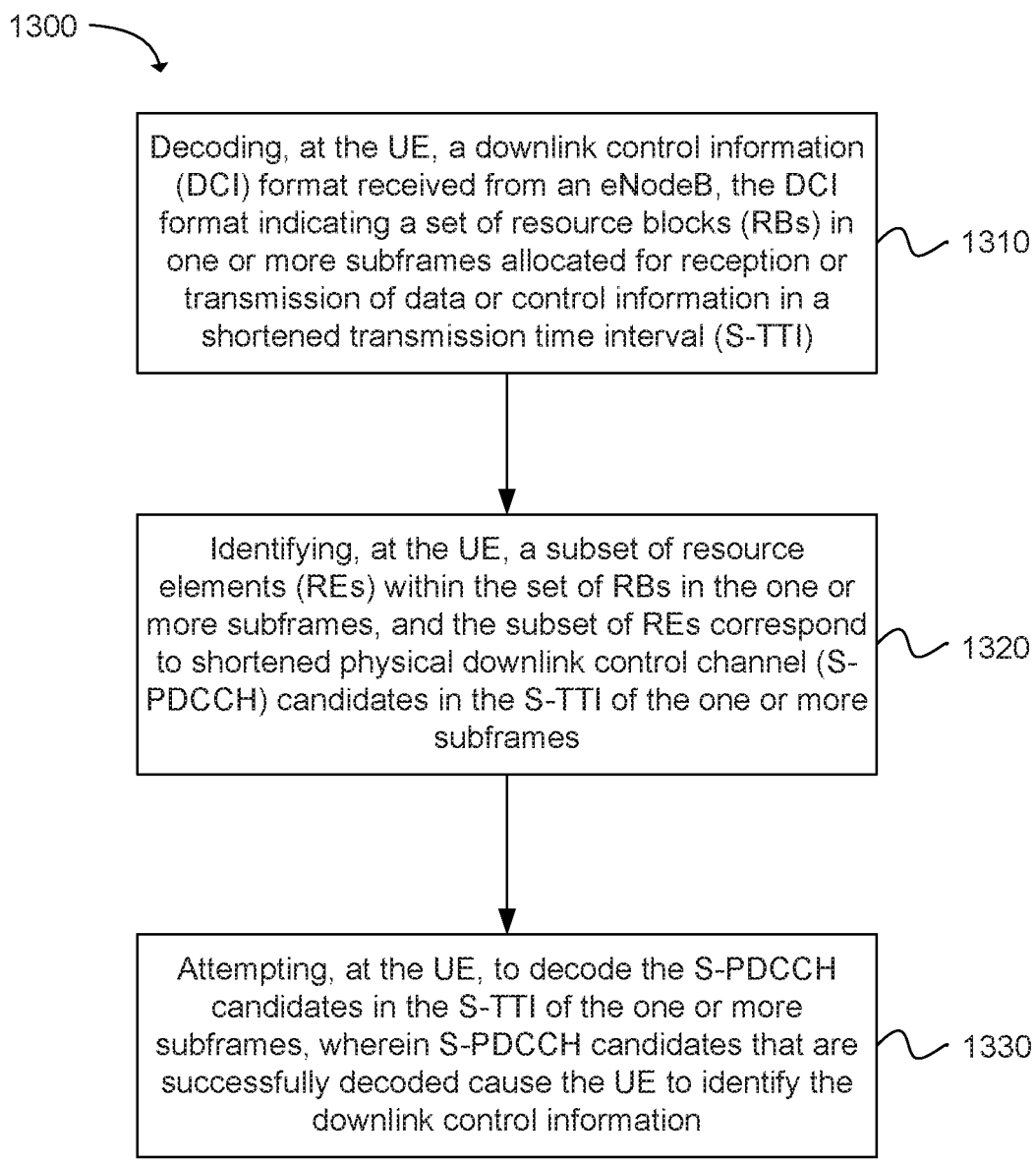
FIG. 13 depicts a flowchart of a machine readable storage medium having instructions embodied thereon for identifying downlink control channel candidates at a user equipment (UE) for receiving downlink control information from an eNodeB in accordance with an example.

Another example provides at least one machine readable storage medium having instructions 1300 embodied thereon for identifying downlink control channel candidates at a user equipment (UE) for receiving downlink control information from an eNodeB, as shown in FIG. 13. The instructions can be executed on a machine, where the instructions are included on at least one computer readable medium or at least one non-transitory machine readable storage medium. The instructions when executed by one or more processors of the UE perform: decoding, at the UE, a downlink control information (DCI) format received from an eNodeB, the DCI format indicating a set of resource blocks (RBs) in one or more subframes allocated for reception or transmission of data or control information in a shortened transmission time interval (S-TTI), as in block 1310. The instructions when executed by one or more processors of the UE perform: identifying, at the UE, a subset of resource elements (REs) within the set of RBs in the one or more subframes, and the subset of REs correspond to shortened physical downlink control channel (S-PDCCH) candidates in the S-TTI of the one or more subframes, as in block 1320. The instructions when executed by one or more processors of the UE perform: attempting, at the UE, to decode the S-PDCCH candidates in the S-TTI of the one or more subframes, wherein S-PDCCH candidates that are successfully decoded cause the UE to identify the downlink control information, as in block 1330.

Figure 14:
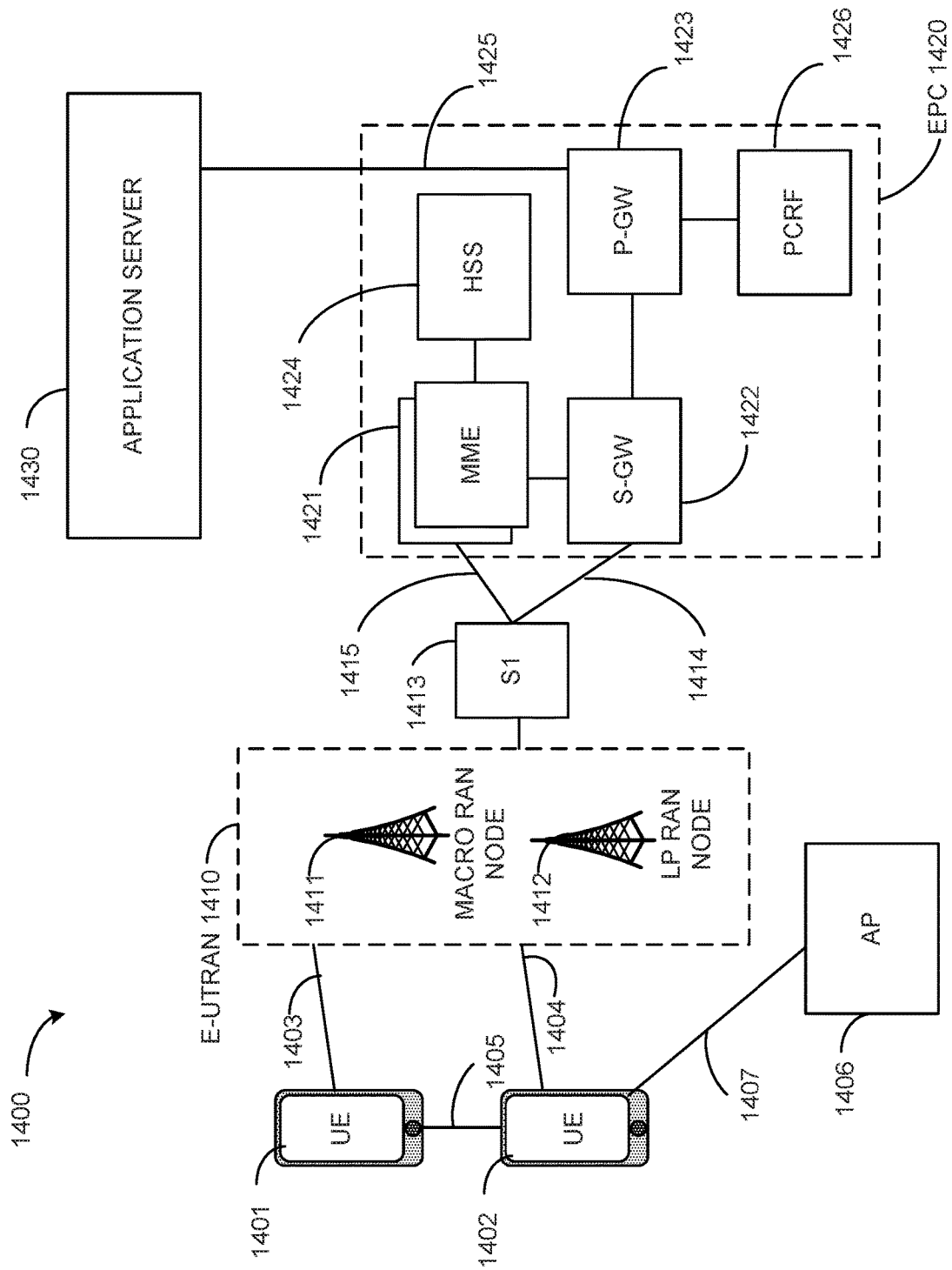
FIG. 14 illustrates an architecture of a wireless network in accordance with an example.

FIG. 14 illustrates an architecture of a wireless network with various components of the network in accordance with some embodiments. A system 1400 is shown to include a user equipment (UE) 1401 and a UE 1402. The UEs 1401 and 1402 are illustrated as smartphones (i.e., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface. In some embodiments, any of the UEs 1401 and 1402 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for (machine initiated) exchanging data with an MTC server and/or device via a public land mobile network (PLMN), Proximity-Based Service (ProSe) or device-to-device (D2D) communication, sensor networks, or IoT networks. An IoT network describes interconnecting uniquely identifiable embedded computing devices (within the internet infrastructure) having short-lived connections, in addition to background applications (e.g., keep-alive messages, status updates, etc.) executed by the IoT UE.

The UEs 1401 and 1402 are configured to access a radio access network (RAN)—in this embodiment, an Evolved Universal Mobile Telecommunications System (UMTS) Terrestrial Radio Access Network (E-UTRAN) 1410. The UEs 1401 and 1402 utilize connections 1403 and 1404, respectively, each of which comprises a physical communications interface or layer (discussed in further detail below); in this example, the connections 1403 and 1404 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, and the like.

In this embodiment, the UEs 1401 and 1402 may further directly exchange communication data via a ProSe interface 1405. The ProSe interface 1405 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1402 is shown to be configured to access an access point (AP) 1406 via connection 1407. The connection 1407 can comprise a local wireless connection, such as a connection consistent with any IEEE 802.11 protocol, wherein the AP 1406 would comprise a wireless fidelity (WiFi) router. In this example, the AP 1406 is shown to be connected to the Internet without connecting to the core network of the wireless system (described in further detail below).

The E-UTRAN 1410 can include one or more access points that enable the connections 1403 and 1404. These access points can be referred to as access nodes, base stations (BSs), NodeBs, RAN nodes, RAN nodes, and so forth, and can comprise ground stations (i.e., terrestrial access points) or satellite access points providing coverage within a geographic area (i.e., a cell). The E-UTRAN 1410 may include one or more RAN nodes 1411 for providing macrocells and one or more RAN nodes 1412 for providing femtocells or picocells (i.e., cells having smaller coverage areas, smaller user capacity, and/or higher bandwidth compared to macrocells).

Any of the RAN nodes 1411 and 1412 can terminate the air interface protocol and can be the first point of contact for the UEs 1401 and 1402. In some embodiments, any of the RAN nodes 1411 and 1412 can fulfill various logical functions for the E-UTRAN 1410 including, but not limited to, radio network controller (RNC) functions such as radio bearer management, uplink and downlink dynamic radio resource management and data packet scheduling, and mobility management.

In accordance with some embodiments, the UEs 1401 and 1402 can be configured to communicate using Orthogonal Frequency-Division Multiplexing (OFDM) communication signals with each other or with any of the RAN nodes 1411 and 1412 over a multicarrier communication channel in accordance various communication techniques, such as an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1411 and 1412 to the UEs 1401 and 1402, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this represents the smallest quantity of resources that currently can be allocated. There are several different physical downlink channels that are conveyed using such resource blocks.

The physical downlink shared channel (PDSCH) carries user data and higher-layer signaling to the UEs 1401 and

1402. The physical downlink control channel (PDCCH) carries information about the transport format and resource allocations related to the PDSCH channel, among other things. It also informs the UEs 1401 and 1402 about the transport format, resource allocation, and H-ARQ (Hybrid Automatic Repeat Request) information related to the uplink shared channel. Typically, downlink scheduling (assigning control and shared channel resource blocks to the UE 102 within a cell) is performed at any of the RAN nodes 1411 and 1412 based on channel quality information fed back from any of the UEs 1401 and 1402, and then the downlink resource assignment information is sent on the PDCCH used for (i.e., assigned to) each of the UEs 1401 and 1402.

The PDCCH uses control channel elements (CCEs) to convey the control information. Before being mapped to resource elements, the PDCCH complex-valued symbols are first organized into quadruplets, which are then permuted using a sub-block inter-leaver for rate matching. Each PDCCH is transmitted using one or more of these CCEs, where each CCE corresponds to nine sets of four physical resource elements known as resource element groups (REGs). Four Quadrature Phase Shift Keying (QPSK) symbols are mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

The E-UTRAN 1410 is shown to be communicatively coupled to a core network—in this embodiment, an Evolved Packet Core (EPC) network 1420 via an S1 interface 1413. In this embodiment the S1 interface 1413 is split into two parts: the S1-U interface 1414, which carries traffic data between the RAN nodes 1411 and 1412 and the serving gateway (S-GW) 1422, and the S1-MME interface 1415, which is a signaling interface between the RAN nodes 1411 and 1412 and the mobility management entities (MMEs) 1421.

In this embodiment, the EPC network 1420 comprises the MMEs 1421, the S-GW 1422, the Packet Data Network (PDN) Gateway (P-GW) 1423, and a home subscriber server (HSS) 1424. The MMEs 1421 are similar in function to the control plane of legacy Serving General Packet Radio Service (GPRS) Support Nodes (SGSN). The MMEs 1421 manage mobility aspects in access such as gateway selection and tracking area list management. The HSS 1424 comprises a database for network users, including subscription-related information to support the network entities' handling of communication sessions. The EPC network 1420 may comprise one or several HSSs 1424, depending on the number of mobile subscribers, on the capacity of the equipment, on the organization of the network, etc. For example, the HSS 1424 can provide support for routing/roaming, authentication, authorization, naming/addressing resolution, location dependencies, etc.

The S-GW 1422 terminates the S1 interface 1413 towards the E-UTRAN 1410, and routes data packets between the E-UTRAN 1410 and the EPC network 1420. In addition, the S-GW 1422 may be a local mobility anchor point for inter-RAN node handovers and also may provide an anchor for inter-3GPP mobility. Other responsibilities may include lawful intercept, charging, and some policy enforcement.

The P-GW 1423 terminates an SGi interface toward a PDN. The P-GW 1423 routes data packets between the EPC network 1423 and external networks such as a network including the application server 1430 (alternatively referred to as application function (AF)) via an Internet Protocol (IP) interface 1425. Generally, the application server 1430 is an element offering applications that use IP bearer resources with the core network (e.g., UMTS Packet Services (PS) domain, LTE PS data services, etc.). In this embodiment, the P-GW 1423 is shown to be communicatively coupled to an application server 1430 via an IP communications interface 1425. The application server 1430 can also be configured to support one or more communication services (e.g., Voice-over-Internet Protocol (VoIP) sessions, PTT sessions, group communication sessions, social networking services, etc.) for the UEs 1401 and 1402 via the EPC network 1420.

The P-GW 1423 may further be a node for policy enforcement and charging data collection. Policy and Charging Enforcement Function (PCRF) 1426 is the policy and charging control element of the EPC network 1420. In a non-roaming scenario, there may be a single PCRF in the Home Public Land Mobile Network (HPLMN) associated with a User Equipment's (UE) Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1426 may be communicatively coupled to the application server 1430 via the P-GW 1423. The application server 1430 may signal the PCRF 1426 to indicate a new service flow and selecting the appropriate Quality of Service (QoS) and charging parameters. The PCRF 1426 may provision this rule into a Policy and Charging Enforcement Function (PCEF) (not shown) with the appropriate traffic flow template (TFT) and QoS class of identifier (QCI), which commences the QoS and charging as specified by the application server.

Figure 15:
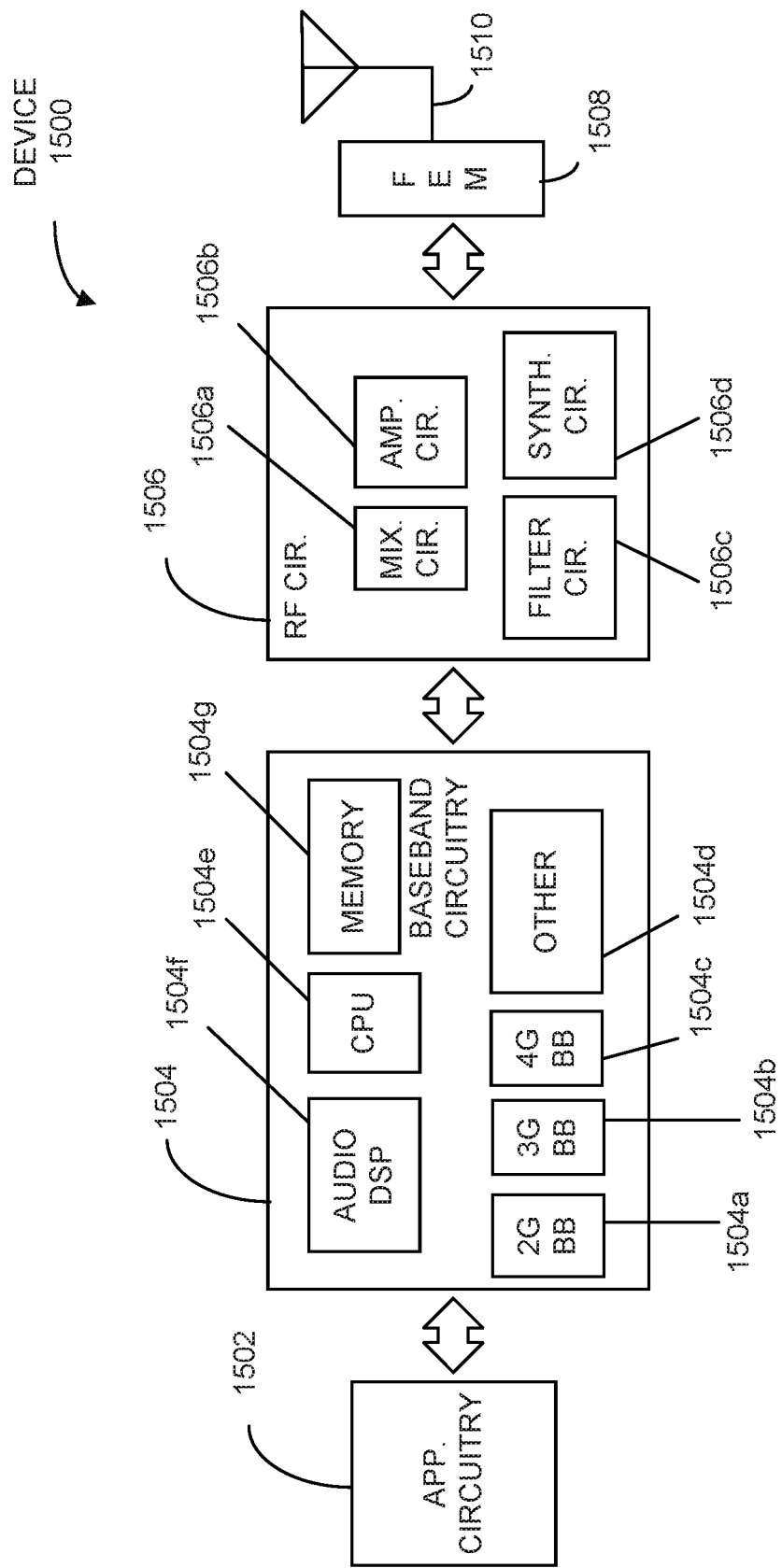
FIG. 15 illustrates a diagram of a wireless device (e.g., UE) in accordance with an example.

FIG. 15 illustrates example components of a device in accordance with some embodiments. In some embodiments, the device 1500 may include application circuitry 1502, baseband circuitry 1504, Radio Frequency (RF) circuitry 1506, front-end module (FEM) circuitry 1508, and one or more antennas 1510, coupled together at least as shown. The components of the illustrated device 1500 may be included a UE or a RAN node. In some embodiments, the device 1500 may include less elements (e.g., a RAN node may not utilize application circuitry 1502, and instead include a processor/controller to process IP data received from an EPC). In some embodiments, the device 1500 may include additional elements such as, for example, memory/storage, display, camera, sensor, and/or input/output (I/O) interface. In other embodiments, the components described below may be included in more than one device (e.g., said circuitries may be separately included in more than one device for Cloud-RAN (C-RAN) implementations).

The application circuitry 1502 may include one or more application processors. For example, the application circuitry 1502 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system. In some embodiments, processors of application circuitry 1502 may process IP data packets received from an EPC.

The baseband circuitry 1504 may include circuitry such as, but not limited to, one or more single-core or multi-core processors. The baseband circuitry 1504 may include one or more baseband processors and/or control logic to process baseband signals received from a receive signal path of the RF circuitry 1506 and to generate baseband signals for a transmit signal path of the RF circuitry 1506. Baseband processing circuity 1504 may interface with the application circuitry 1502 for generation and processing of the baseband signals and for controlling operations of the RF circuitry 1506. For example, in some embodiments, the baseband circuitry 1504 may include a second generation (2G) baseband processor 1504a, third generation (3G) baseband processor 1504b, fourth generation (4G) baseband processor 1504c, and/or other baseband processor(s) 1504d for other existing generations, generations in development or to be developed in the future (e.g., fifth generation (5G), 6G, etc.). The baseband circuitry 1504 (e.g., one or more of baseband processors 1504a-d) may handle various radio control functions that enable communication with one or more radio networks via the RF circuitry 1506. In other embodiments, some or all of the functionality of baseband processors 1504a-d may be included in modules stored in the memory 1504g and executed via a Central Processing Unit (CPU) 1504e. The radio control functions may include, but are not limited to, signal modulation/demodulation, encoding/decoding, radio frequency shifting, etc. In some embodiments, modulation/demodulation circuitry of the baseband circuitry 1504 may include Fast-Fourier Transform (FFT), precoding, and/or constellation mapping/demapping functionality. In some embodiments, encoding/decoding circuitry of the baseband circuitry 1504 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry may include one or more audio digital signal processor(s) (DSP) 1504f. The audio DSP(s) 1504f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1504 and the application circuitry 1502 may be implemented together such as, for example, on a system on a chip (SOC).

In some embodiments, the baseband circuitry 1504 may provide for communication compatible with one or more radio technologies. For example, in some embodiments, the baseband circuitry 1504 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 1504 is configured to support radio communications of more than one wireless protocol may be referred to as multi-mode baseband circuitry.

RF circuitry 1506 may enable communication with wireless networks using modulated electromagnetic radiation through a non-solid medium. In various embodiments, the RF circuitry 1506 may include switches, filters, amplifiers, etc. to facilitate the communication with the wireless network. RF circuitry 1506 may include a receive signal path which may include circuitry to down-convert RF signals received from the FEM circuitry 1508 and provide baseband signals to the baseband circuitry 1504. RF circuitry 1506 may also include a transmit signal path which may include circuitry to up-convert baseband signals provided by the baseband circuitry 1504 and provide RF output signals to the FEM circuitry 1508 for transmission.

In some embodiments, the RF circuitry 1506 may include a receive signal path and a transmit signal path. The receive signal path of the RF circuitry 1506 may include mixer circuitry 1506a, amplifier circuitry 1506b and filter circuitry 1506c. The transmit signal path of the RF circuitry 1506 may include filter circuitry 1506c and mixer circuitry 1506a. RF circuitry 1506 may also include synthesizer circuitry 1506d for synthesizing a frequency for use by the mixer circuitry 1506a of the receive signal path and the transmit signal path. In some embodiments, the mixer circuitry 1506a of the receive signal path may be configured to down-convert RF signals received from the FEM circuitry 1508 based on the synthesized frequency provided by synthesizer circuitry 1506d. The amplifier circuitry 1506b may be configured to amplify the down-converted signals and the filter circuitry 1506c may be a low-pass filter (LPF) or band-pass filter (BPF) configured to remove unwanted signals from the down-converted signals to generate output baseband signals. Output baseband signals may be provided to the baseband circuitry 1504 for further processing. In some embodiments, the output baseband signals may be zero-frequency baseband signals, although this is not a requirement. In some embodiments, mixer circuitry 1506a of the receive signal path may comprise passive mixers, although the scope of the embodiments is not limited in this respect.

In some embodiments, the mixer circuitry 1506a of the transmit signal path may be configured to up-convert input baseband signals based on the synthesized frequency provided by the synthesizer circuitry 1506d to generate RF output signals for the FEM circuitry 1508. The baseband signals may be provided by the baseband circuitry 1504 and may be filtered by filter circuitry 1506c. The filter circuitry 1506c may include a low-pass filter (LPF), although the scope of the embodiments is not limited in this respect.

In some embodiments, the mixer circuitry 1506a of the receive signal path and the mixer circuitry 1506a of the transmit signal path may include two or more mixers and may be arranged for quadrature downconversion and/or upconversion respectively. In some embodiments, the mixer circuitry 1506a of the receive signal path and the mixer circuitry 1506a of the transmit signal path may include two or more mixers and may be arranged for image rejection (e.g., Hartley image rejection). In some embodiments, the mixer circuitry 1506a of the receive signal path and the mixer circuitry 1506a may be arranged for direct downconversion and/or direct upconversion, respectively. In some embodiments, the mixer circuitry 1506a of the receive signal path and the mixer circuitry 1506a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1506 may include analog-to-digital converter (ADC) and digital-to-analog converter (DAC) circuitry and the baseband circuitry 1504 may include a digital baseband interface to communicate with the RF circuitry 1506.

In some dual-mode embodiments, a separate radio IC circuitry may be provided for processing signals for each spectrum, although the scope of the embodiments is not limited in this respect.

In some embodiments, the synthesizer circuitry 1506d may be a fractional-N synthesizer or a fractional N/N+1 synthesizer, although the scope of the embodiments is not limited in this respect as other types of frequency synthesizers may be suitable. For example, synthesizer circuitry 1506d may be a delta-sigma synthesizer, a frequency multiplier, or a synthesizer comprising a phase-locked loop with a frequency divider.

The synthesizer circuitry 1506d may be configured to synthesize an output frequency for use by the mixer circuitry 1506a of the RF circuitry 1506 based on a frequency input and a divider control input. In some embodiments, the synthesizer circuitry 1506d may be a fractional N/N+1 synthesizer.

In some embodiments, frequency input may be provided by a voltage controlled oscillator (VCO), although that is not a requirement. Divider control input may be provided by either the baseband circuitry 1504 or the applications processor 1502 depending on the desired output frequency. In some embodiments, a divider control input (e.g., N) may be determined from a look-up table based on a channel indicated by the applications processor 1502.

Synthesizer circuitry 1506d of the RF circuitry 1506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1506d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1506 may include an IQ/polar converter.

FEM circuitry 1508 may include a receive signal path which may include circuitry configured to operate on RF signals received from one or more antennas 1510, amplify the received signals and provide the amplified versions of the received signals to the RF circuitry 1506 for further processing. FEM circuitry 1508 may also include a transmit signal path which may include circuitry configured to amplify signals for transmission provided by the RF circuitry 1506 for transmission by one or more of the one or more antennas 1510.

In some embodiments, the FEM circuitry 1508 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1506). The transmit signal path of the FEM circuitry 1508 may include a power amplifier (PA) to amplify input RF signals (e.g., provided by RF circuitry 1506), and one or more filters to generate RF signals for subsequent transmission (e.g., by one or more of the one or more antennas 1510.

In some embodiments, the device 1500 comprises a plurality of power saving mechanisms. If the device 1500 is in an RRC_Connected state, where it is still connected to the RAN node as it expects to receive traffic shortly, then it may enter a state known as Discontinuous Reception Mode (DRX) after a period of inactivity. During this state, the device may power down for brief intervals of time and thus save power.

If there is no data traffic activity for an extended period of time, then the device 1500 may transition off to an RRC_Idle state, where it disconnects from the network and does not perform operations such as channel quality feedback, handover, etc. The device 1500 goes into a very low power state and it performs paging where again it periodically wakes up to listen to the network and then powers down again. The device cannot receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1502 and processors of the baseband circuitry 1504 may be used to execute elements of one or more instances of a protocol stack. For example, processors of the baseband circuitry 1504, alone or in combination, may be used execute Layer 3, Layer 2, and/or Layer 1 functionality, while processors of the application circuitry 1504 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 16:
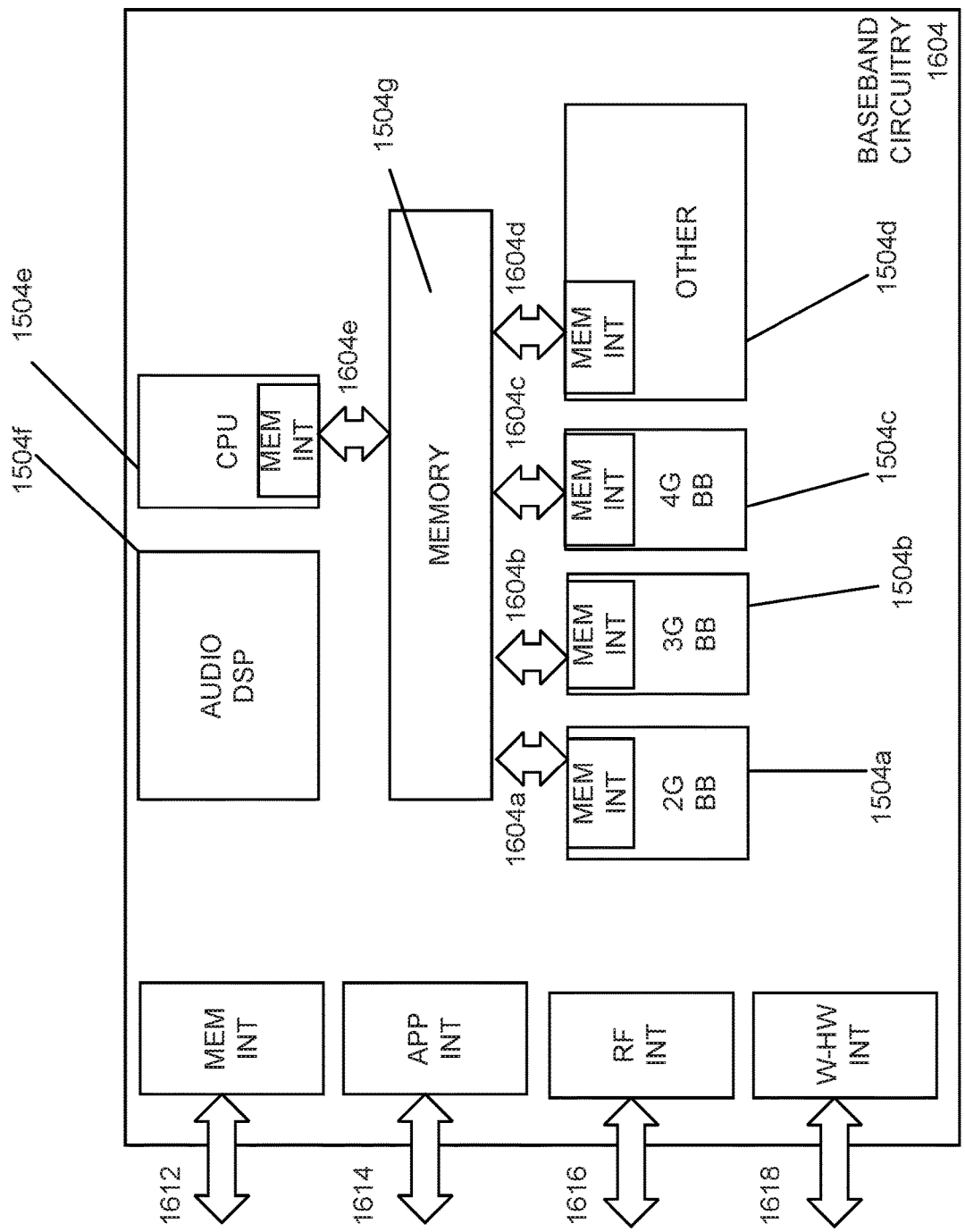
FIG. 16 illustrates interfaces of baseband circuitry in accordance with an example.

FIG. 16 illustrates example interfaces of baseband circuitry in accordance with some embodiments. As discussed above, the baseband circuitry 1504 of FIG. 15 may comprise processors 1504a-1504e and a memory 1504g utilized by said processors. Each of the processors 1504a-1504e may include a memory interface, 1604a-1604e, respectively, to send/receive data to/from the memory 1504g.

The baseband circuitry 1504 may further include one or more interfaces to communicatively couple to other circuitries/devices, such as a memory interface 1612 (e.g., an interface to send/receive data to/from memory external to the baseband circuitry 1504), an application circuitry interface 1614 (e.g., an interface to send/receive data to/from the application circuitry 1502 of FIG. 15), an RF circuitry interface 1616 (e.g., an interface to send/receive data to/from RF circuitry 1506 of FIG. 15), and a wireless hardware connectivity interface 1618 (e.g., an interface to send/receive data to/from Near Field Communication (NFC) components, Bluetooth® components (e.g., Bluetooth® Low Energy), Wi-Fi® components, and other communication components).

Figure 17:
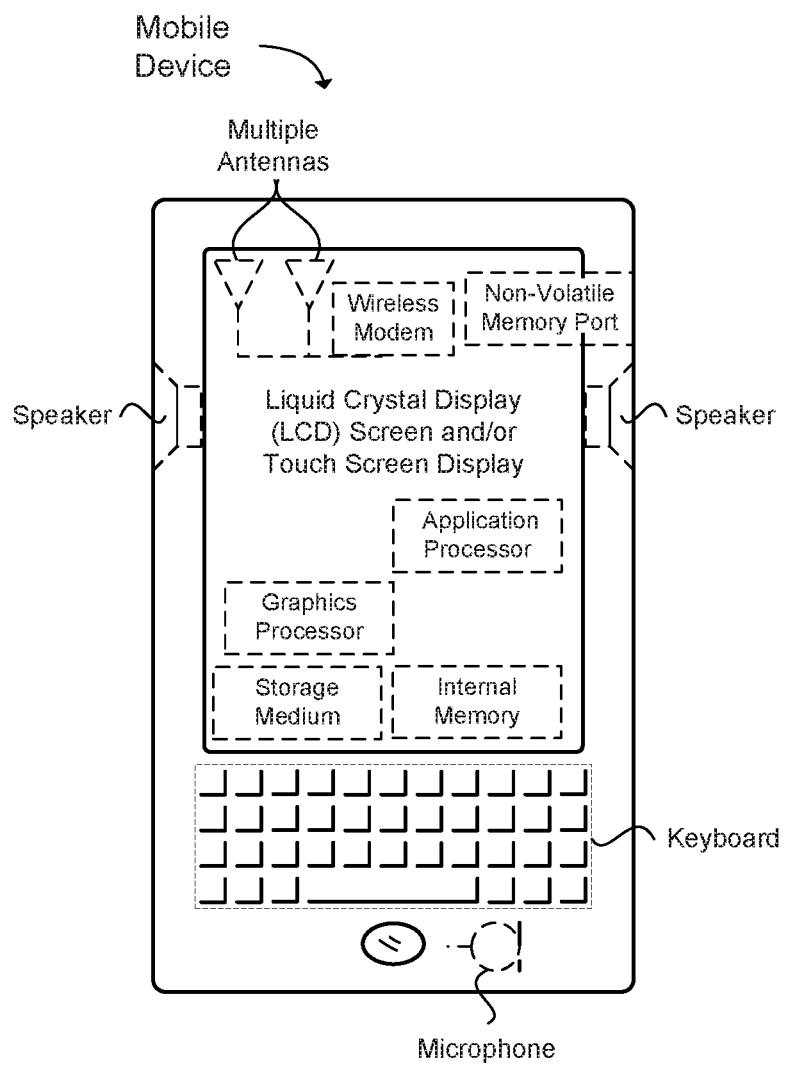
FIG. 17 illustrates a diagram of a wireless device (e.g., UE) in accordance with an example.

FIG. 17 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 17 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE) operable to identify downlink control channel candidates for receiving downlink control information, the apparatus comprising: one or more processors configured to: decode a downlink control information (DCI) format received from an eNodeB, the DCI format indicating a set of resource blocks (RBs) in one or more subframes allocated for reception or transmission of data or control information in a shortened transmission time interval (S-TTI); identify a subset of resource elements (REs) within the set of RBs in the one or more subframes, wherein the subset of REs correspond to shortened physical downlink control channel (S-PDCCH) candidates in the S-TTI of the one or more subframes; and attempt to decode the S-PDCCH candidates in the S-TTI of the one or more subframes, wherein S-PDCCH candidates that are successfully decoded cause the UE to identify the downlink control information; and memory configured to store the identified downlink control information.

Example 2 includes the apparatus of Example 1, further comprising a transceiver configured to: receive the DCI format from the eNodeB; and receive the downlink control information from the eNodeB.

Example 3 includes the apparatus of any of Examples 1 to 2, wherein the DCI format includes: time-frequency radio resource assignment information; and one or more of a modulation and coding rate, a S-PDCCH control size or a reference signal (RS) type.

Example 4 includes the apparatus of any of Examples 1 to 3, wherein the DCI format is received on a legacy PDCCH region, and downlink control resources used for the DCI format are identified by: a dedicated radio network temporary identifier (RNTI) value assigned by higher layers, or a predefined value in a 1-bit information element (IE) field in the DCI format.

Example 5 includes the apparatus of any of Examples 1 to 4, wherein the one or more processors are further configured to: determine, at the UE, a starting orthogonal frequency division multiplexing (OFDM) symbol and a number of OFDM symbols in one or more subframes used for an S-PDCCH transmission from the eNodeB; identify a group of REs in the OFDM symbols to form one or more shortened resource element groups (S-REGs), wherein the group of REs in the OFDM symbol corresponds to the subset of REs within the set of RBs in the one or more subframes; identify one or more S-TTI control channel elements (S-CCEs) from the one or more S-REGs; and aggregate the one or more S-CCEs, wherein the S-PDCCH transmission is received from the eNodeB using the one or more aggregated S-CCEs.

Example 6 includes the apparatus of any of Examples 1 to 5, wherein: the starting OFDM symbol used for the S-PDCCH transmission from the eNodeB is determined based on a number of OFDM symbols in the S-TTI or configured via higher layer signaling; and the number of OFDM symbols used for the S-PDCCH transmission from the eNodeB is: signaled by the DCI format, or configured via higher layer signaling, or defined in a Third Generation Partnership Project (3GPP) Long-Term Evolution (LTE) specification, or dependent on a UE-specific S-TTI length that is configured by higher layers.

Example 7 includes the apparatus of any of Examples 1 to 6, wherein: the S-CCE includes three S-REGs, and each S-REG includes all REs except REs carrying a demodulation reference signal (DMRS) within one physical resource block (PRB) in one OFDM symbol in an increasing order of frequency; or the S-CCE includes two S-REGs, and each S-REG includes all REs except REs carrying a DMRS within one PRB in two consecutive OFDM symbols; or the S-CCE includes six S-REGs, and each S-REG includes six REs.

Example 8 includes the apparatus of any of Examples 1 to 7, wherein: one S-REG includes REs k within one OFDM symbol with k=$k_0$+0, $k_0$+1, . . . , $k_0$+5, wherein $k_0$ is a first RE in frequency index in a PRB; or one S-REG includes REs k within one OFDM symbol with k=$k_0$+6, $k_0$+7, . . . , $k_0$+11; or one S-REG includes even REs k within one OFDM symbol with $k=k_0+0, k_0+2, \ldots, k_0+10$; or one S-REG includes odd REs k within one OFDM symbol with $k=k_0+1, k_0+7, \ldots, k_0+11$.

Example 9 includes the apparatus of any of Examples 1 to 8, wherein the one or more processors are further configured to map a block of encoded DCI symbols to REs in the one or more S-REGs, wherein the REs are not utilized for a cell-specific reference signal (CRS), zero power (ZP) channel state information reference signal (CSI-RS) or nonzero power (NZP) CSI-RS.

Example 10 includes the apparatus of any of Examples 1 to 9, wherein: a S-CCE number (n) corresponds to S-REGs in $N_{S\text{-}REG}^{S\text{-}CCE}$ consecutive physical resource block (PRB) indices starting from a PRB $N_{RB}^{(0)}+n\times N_{S\text{-}REG}^{S\text{-}CCE}$, where $N_{RB}^{(0)}$ is a starting PRB within an allocated S-TTI PRB sets and $N_{S\text{-}REG}^{S\text{-}CCE}$ represents a number of S-REGs per S-CCE; or a S-CCE number (n) corresponds to S-REGs in a PRB numbered with $N_{RB}^{(0)}+n+j\times \lceil N_{RB}^{S}/N_{S\text{-}REG}^{S\text{-}CCE} \rceil$, where $j=0, \ldots, N_{S\text{-}REG}^{S\text{-}CCE}-1$, and $N_{RB}^{S}$ is a total number of RBs for an allocated S-TTI PRB set; or a S-CCE number (n) corresponds to S-REGs numbered (n mod $N_{S\text{-}REG}^{RB}$)+ $jN_{S\text{-}REG}^{RB}$ in a PRB index $(k+n\times N_{S\text{-}REG}^{S\text{-}CCE}/N_{S\text{-}REG}^{RB}+N_{RB}^{(0)})$; where $k=0, 1, \ldots, N_{S\text{-}REG}^{S\text{-}CCE}/N_{S\text{-}REG}^{RB}-1$, and $N_{S\text{-}REG}^{RB}$ is a total number of S-REGs within a single RB; or a S-CCE number (n) corresponds to S-REGs numbered (n mod $N_{S\text{-}REG}^{RB}$) in PRB indices $N_{RB}^{(0)}+n+l\times \lceil N_{RB}^{S/N}{}_{S\text{-}REG}^{S\text{-}CCE} \rceil$, where $l=0, 1, \ldots, N_{S\text{-}REG}^{S\text{-}CCE}-1$.

Example 11 includes the apparatus of any of Examples 1 to 10, wherein: S-CCEs corresponding to a S-PDCCH candidate m of a search space at aggregation level L is given by: $L\{m \bmod \lfloor N_{S\text{-}CCE,k}/L \rfloor\}+i$, wherein $i=0, L-1, m=0, 1, \ldots M^{(L)}-1$ and $M^{(L)}$ is a number of S-PDCCH candidates to monitor at aggregation level L; or S-CCEs corresponding to a S-PDCCH candidate m of an S-PDCCH specific search space $SS_k^{(L)}$ is given by: $L\{(Y_k+m) \bmod \lfloor N_{S\text{-}CCE,k}/L \rfloor\}+i$, wherein $i=0, \ldots, L-1, m=0, 1, \ldots M^{(L)}$ is and $M^{(L)}$ is a number of S-PDCCH candidates to monitor at aggregation level L in an S-TTI RB set, and $Y_k$ is defined by: $Y_k=(A\cdot Y_{k-1}) \bmod D$, wherein $Y_{-1}=n_{RNTI}\neq 0$, $A=39827$, $D=65537$, and k is an S-TTI index within the one or more subframes, wherein $N_{S\text{-}CCE,k}$ is a number of S-CCEs in a control region of the S-PDCCH in S-TTI k.

Example 12 includes the apparatus of any of Examples 1 to 11, wherein a number of aggregation levels (L) and a number of S-PDCCH candidates to monitor at a given aggregation level L is configured via higher layer signaling for the UE or dynamically configured by the DCI format transmitted to the UE in the one or more subframes.

Example 13 includes the apparatus of any of Examples 1 to 12, wherein: a DCI format used to schedule a shortened physical downlink shared channel (S-PDSCH) and a shortened physical uplink shared channel (S-PUSCH) in the S-TTI in the one or more subframes is received on a legacy PDCCH region, and legacy PDCCH candidates are determined based on a dedicated cell radio network temporary identifier (C-RNTI) assigned by higher layers; or a DCI format used to schedule the S-PDSCH and the S-PUSCH in the S-TTI in the one or more subframes is received over the S-PDCCH.

Example 14 includes the apparatus of any of Examples 1 to 13, wherein: a DCI format used to schedule a shortened physical downlink shared channel (S-PDSCH) and a shortened physical uplink shared channel (S-PUSCH) in the S-TTI in the one or more subframes is received on a legacy PDCCH region when the UE is configured with a cell-specific reference signal (CRS) for S-PDCCH demodulation; or a DCI format used to schedule the S-PDSCH and the S-PUSCH in the S-TTI in the one or more subframes is received over the S-PDCCH when the UE is not configured with CRS for S-PDCCH demodulation.

Example 15 includes the apparatus of any of Examples 1 to 14, wherein: a number of information bits in a DCI format used for a shortened physical downlink shared channel (S-PDSCH) is equal to a number of information bits in a DCI format used for shortened physical uplink shared channel (S-PUSCH) scheduling in a single S-TTI; and a DCI format used for the S-PDSCH and the DCI format used for the S-PUSCH scheduling are distinguished using a 1-bit flag information element (IE) that is included in each of the DCI format used for the S-PDSCH and the DCI format used for the S-PUSCH scheduling.

Example 16 includes an apparatus of an eNodeB operable to provide downlink control information, the apparatus comprising: memory; and one or more processors configured to: encode a downlink control information (DCI) format for transmission to a user equipment (UE), the DCI format indicating a set of resource blocks (RBs) one or more subframes allocated for reception or transmission of data or control information in a shortened transmission time interval (S-TTI); and encode the downlink control information for transmission to the UE, wherein a subset of resource elements (REs) within the set of RBs in the one or more subframes corresponds to shortened physical downlink control channel (S-PDCCH) candidates in the S-TTI of the one or more subframes, and the S-PDCCH candidates in the S-TTI of the one or more subframes correspond to the downlink control information.

Example 17 includes the apparatus of Example 16, wherein the DCI format includes: time-frequency radio resource assignment information; and one or more of a modulation and coding rate, a S-PDCCH control size or a reference signal (RS) type.

Example 18 includes the apparatus of any of Examples 16 to 17, wherein the DCI format is transmitted on a legacy PDCCH region, and downlink control resources used for the DCI format are identified by: a dedicated radio network temporary identifier (RNTI) value assigned by higher layers, or a predefined value in a 1-bit information element (IE) field in the DCI format.

Example 19 includes the apparatus of any of Examples 16 to 18, wherein a number of aggregation levels (L) and a number of S-PDCCH candidates for monitoring at a given aggregation level L is configured via higher layer signaling to the UE or dynamically configured by the DCI format transmitted to the UE in the one or more subframes.

Example 20 includes at least one machine readable storage medium having instructions embodied thereon for identifying downlink control channel candidates at a user equipment (UE) for receiving downlink control information from an eNodeB, the instructions when executed by one or more processors of the UE perform the following: decoding, at the UE, a downlink control information (DCI) format received from an eNodeB, the DCI format indicating a set of resource blocks (RBs) in one or more subframes allocated for reception or transmission of data or control information in a shortened transmission time interval (S-TTI); identifying, at the UE, a subset of resource elements (REs) within the set of RBs in the one or more subframes, and the subset of REs correspond to shortened physical downlink control channel (S-PDCCH) candidates in the S-TTI of the one or more subframes; and attempting, at the UE, to decode the S-PDCCH candidates in the S-TTI of the one or more subframes, wherein S-PDCCH candidates that are successfully decoded cause the UE to identify the downlink control information.

Example 21 includes the at least one machine readable storage medium of Example 20, further comprising instructions when executed perform the following: determining, at the UE, a starting orthogonal frequency division multiplexing (OFDM) symbol and a number of OFDM symbols in the one or more subframes used for an S-PDCCH transmission from the eNodeB; identifying a group of REs in the OFDM symbols to form one or more shortened resource element groups (S-REGs), wherein the group of REs in the OFDM symbol corresponds to the subset of REs within the set of RBs in the one or more subframes; identifying one or more S-TTI control channel elements (S-CCEs) from the one or more S-REGs; and aggregating the one or more S-CCEs, wherein the S-PDCCH transmission is received from the eNodeB using the one or more aggregated S-CCEs.

Example 22 includes the at least one machine readable storage medium of any of Examples 20 to 21, wherein: the starting OFDM symbol used for the S-PDCCH transmission from the eNodeB is determined based on a number of OFDM symbols in the S-TTI or configured via higher layer signaling; and the number of OFDM symbols used for the S-PDCCH transmission from the eNodeB is signaled by the DCI format or configured via higher layer signaling, and the number of OFDM symbols depends on a UE-specific S-TTI length.

Example 23 includes the at least one machine readable storage medium of any of Examples 20 to 22, wherein: the S-CCE includes three S-REGs, and each S-REG includes all REs except REs carrying a demodulation reference signal (DMRS) within one physical resource block (PRB) in one OFDM symbol in an increasing order of frequency; or the S-CCE includes two S-REGs, and each S-REG includes all REs except REs carrying a DMRS within one PRB in two consecutive OFDM symbols; or the S-CCE includes six S-REGs, and each S-REG includes six REs.

Example 24 includes the at least one machine readable storage medium of any of Examples 20 to 23, wherein: one S-REG includes REs k within one OFDM symbol with $k=k_0+0, k_0+1, \ldots, k_0+5$, wherein $k_0$ is a first RE in frequency index in a PRB; or one S-REG includes REs k within one OFDM symbol with $k=k_0+6, k_0+7, \ldots, k_0+11$; or one S-REG includes even REs k within one OFDM symbol with $k=k_0+0, k_0+2, \ldots, k_0+10$; or one S-REG includes odd REs k within one OFDM symbol with $k=k_0+1, k_0+7, \ldots, k_0+11$.

Example 25 includes the at least one machine readable storage medium of any of Examples 20 to 24, further comprising instructions when executed perform the following: mapping a block of encoded DCI symbols to REs in the one or more S-REGs, wherein the REs are not utilized for a cell-specific reference signal (CRS), zero power (ZP) channel state information reference signal (CSI-RS) or nonzero power (NZP) CSI-RS.

Example 26 includes the at least one machine readable storage medium of any of Examples 20 to 25, wherein: a S-CCE number (n) corresponds to S-REGs in $N_{S-REG}^{S-CCE}$ consecutive physical resource block (PRB) indices starting from a PRB $N_{RB}^{(0)}+n \times N_{S-REG}^{S-CCE}$, where $N_{RB}^{(0)}$ is a starting PRB within an allocated S-TTI PRB sets and $N_{S-REG}^{S-CCE}$ represents a number of S-REGs per S-CCE; or a S-CCE number (n) corresponds to S-REGs in a PRB numbered with $N_{RB}^{(0)}+n+j \times [N_{RB}^S/N_{S-REG}^{S-CCE}]$, where $j=0, \ldots, N_{S-REG}^{S-CCE}-1$, and $N_{RB}^S$ is a total number of RBs for an allocated S-TTI PRB set; or a S-CCE number (n) corresponds to S-REGs numbered (n mod $N_{S-REG}^{RB})+jN_{S-REG}^{RB}$ in a PRB index $(k+n \times N_{S-REG}^{S-CCE}/N_{S-REG}^{RB}+N_{RB}^{(0)})$; where $k=0, 1, \ldots, N_{S-REG}^{S-CCE}/N_{S-REG}^{RB}-1$, and $N_{S-REG}^{RB}$ is a total number of S-REGs within a single RB; or a S-CCE number (n) corresponds to S-REGs numbered (n mod $N_{S-REG}^{RB}$) in PRB indices $N_{RB}^{(0)}+n+1 \times [N_{RB}^{S/N}{}_{S-REG}^{S-CCE}]$, where $l=0, 1, \ldots, N_{S-REG}^{S-CCE}-1$ Example 27 includes the at least one machine readable storage medium of any of Examples 20 to 26, wherein: S-CCEs corresponding to a S-PDCCH candidate m of a search space at aggregation level L is given by: $L\{m \bmod \lfloor N_{S-CCE,k}/L \rfloor\}+i$, wherein $i=0, \ldots, L-1, m=0, 1, \ldots M^{(L)}-1$ and $M^{(L)}$ is a number of S-PDCCH candidates to monitor at aggregation level L; or S-CCEs corresponding to a S-PDCCH candidate m of an S-PDCCH specific search space $SS_k^{(L)}$ is given by: $L\{(Y_k+m) \bmod \lfloor N_{S-CCE,k}/L \rfloor\}+i$, wherein $i=0, \ldots L-1, m=0, 1, \ldots M^{(L)}-1$ and $M^{(L)}$ is a number of S-PDCCH candidates to monitor at aggregation level L in an S-TTI RB set, and $Y_k$ is defined by: $Y_k=(A \cdot Y_{k-1}) \bmod D$, wherein $Y_{-1}=n_{RNTI} \neq 0$, $A=39827$, $D=65537$, and k is an S-TTI index within the one or more subframes, wherein $N_{S-CCE,k}$ is a number of S-CCEs in a control region of the S-PDCCH in S-TTI k.

Example 28 includes the at least one machine readable storage medium of any of Examples 20 to 27, further comprising: a DCI format used to schedule a shortened physical downlink shared channel (S-PDSCH) and a shortened physical uplink shared channel (S-PUSCH) in the S-TTI in the one or more subframes is received on a legacy PDCCH region, and legacy PDCCH candidates are determined based on a dedicated cell radio network temporary identifier (C-RNTI) assigned by higher layers; or a DCI format used to schedule the S-PDSCH and the S-PUSCH in the S-TTI in the one or more subframes is received over the S-PDCCH in the S-TTI in the one or more subframes based on higher layers.

Example 29 includes the at least one machine readable storage medium of any of Examples 20 to 28, further comprising: a DCI format used to schedule a shortened physical downlink shared channel (S-PDSCH) and a shortened physical uplink shared channel (S-PUSCH) in the S-TTI in the one or more subframes is received on a legacy PDCCH region when the UE is configured with a cell-specific reference signal (CRS) for S-PDCCH demodulation; or a DCI format used to schedule the S-PDSCH and the S-PUSCH in the S-TTI in the one or more subframes is received over the S-PDCCH when the UE is not configured with CRS for S-PDCCH demodulation.

Example 30 includes the at least one machine readable storage medium of any of Examples 20 to 29, wherein: a number of information bits in a DCI format used for a shortened physical downlink shared channel (S-PDSCH) is equal to a number of information bits in a DCI format used for shortened physical uplink shared channel (S-PUSCH) scheduling in a single S-TTI; and a DCI format used for the S-PDSCH and the DCI format used for the S-PUSCH scheduling are distinguished using a 1-bit flag information element (IE) that is included in each of the DCI format used for the S-PDSCH and the DCI format used for the S-PUSCH scheduling.

Example 31 includes a user equipment (UE) operable to identify downlink control channel candidates for receiving downlink control information from an eNodeB, the UE comprising: means for decoding, at the UE, a downlink control information (DCI) format received from an eNodeB, the DCI format indicating a set of resource blocks (RBs) in one or more subframes allocated for reception or transmission of data or control information in a shortened transmission time interval (S-TTI); means for identifying, at the UE, a subset of resource elements (REs) within the set of RBs in the one or more subframes, and the subset of REs correspond to shortened physical downlink control channel (S-PDCCH) candidates in the S-TTI of the one or more subframes; and means for attempting, at the UE, to decode the S-PDCCH candidates in the S-TTI of the one or more subframes, wherein S-PDCCH candidates that are successfully decoded cause the UE to identify the downlink control information.

Example 32 includes the UE of Example 31, further comprising: means for determining, at the UE, a starting orthogonal frequency division multiplexing (OFDM) symbol and a number of OFDM symbols in the one or more subframes used for an S-PDCCH transmission from the eNodeB; means for identifying a group of REs in the OFDM symbols to form one or more shortened resource element groups (S-REGs), wherein the group of REs in the OFDM symbol corresponds to the subset of REs within the set of RBs in the one or more subframes; means for identifying one or more S-TTI control channel elements (S-CCEs) from the one or more S-REGs; and means for aggregating the one or more S-CCEs, wherein the S-PDCCH transmission is received from the eNodeB using the one or more aggregated S-CCEs.

Example 33 includes the UE of any of Examples 31 to 32, wherein: the starting OFDM symbol used for the S-PDCCH transmission from the eNodeB is determined based on a number of OFDM symbols in the S-TTI or configured via higher layer signaling; and the number of OFDM symbols used for the S-PDCCH transmission from the eNodeB is signaled by the DCI format or configured via higher layer signaling, and the number of OFDM symbols depends on a UE-specific S-TTI length.

Example 34 includes the UE of any of Examples 31 to 33, wherein: the S-CCE includes three S-REGs, and each S-REG includes all REs except REs carrying a demodulation reference signal (DMRS) within one physical resource block (PRB) in one OFDM symbol in an increasing order of frequency; or the S-CCE includes two S-REGs, and each S-REG includes all REs except REs carrying a DMRS within one PRB in two consecutive OFDM symbols; or the S-CCE includes six S-REGs, and each S-REG includes six REs.

Example 35 includes the UE of any of Examples 31 to 34, wherein: one S-REG includes REs k within one OFDM symbol with $k=k_0+0, k_0+1, \ldots, k_0+5$, wherein $k_0$ is a first RE in frequency index in a PRB; or one S-REG includes REs k within one OFDM symbol with $k=k_0+6, k_0+7, \ldots, k_0+11$; or one S-REG includes even REs k within one OFDM symbol with $k=k_0+0, k_0+2, \ldots, k_0+10$; or one S-REG includes odd REs k within one OFDM symbol with $k=k_0+1, k_0+7, \ldots, k_0+11$.

Example 36 includes the UE of any of Examples 31 to 35, further comprising: means for mapping a block of encoded DCI symbols to REs in the one or more S-REGs, wherein the REs are not utilized for a cell-specific reference signal (CRS), zero power (ZP) channel state information reference signal (CSI-RS) or nonzero power (NZP) CSI-RS.

Example 37 includes the UE of any of Examples 31 to 36, wherein: a S-CCE number (n) corresponds to S-REGs in $N_{S-REG}^{S-CCE}$ consecutive physical resource block (PRB) indices starting from a PRB $N_{RB}^{(0)}+n \times N_{S-REG}^{S-CCE}$, where $N_{RB}^{(0)}$ is a starting PRB within an allocated S-TTI PRB sets and $N_{S-REG}^{S-CCE}$ represents a number of S-REGs per S-CCE; or a S-CCE number (n) corresponds to S-REGs in a PRB numbered with $N_{RB}^{(0)}+n+j \times \lceil N_{RB}^{S}/N_{S-REG}^{S-CCE} \rceil$, where $j=0, \ldots, N_{S-REG}^{S-CCE}-1$, and $N_{RB}^{S}$ is a total number of RBs for an allocated S-TTI PRB set; or a S-CCE number (n) corresponds to S-REGs numbered (n mod $N_{S-REG}^{RB}$)+ $jN_{S-REG}^{RB}$ in a PRB index $(k+n \times N_{S-REG}^{S-CCE}/N_{S-REG}^{RB}+ N_{RB}^{(0)})$; where $k=0, 1, \ldots, N_{S-REG}^{S-CCE}/N_{S-REG}^{RB}-1$, and $N_{S-REG}^{RB}$ is a total number of S-REGs within a single RB; or a S-CCE number (n) corresponds to S-REGs numbered (n mod $N_{S-REG}^{RB}$) in PRB indices $N_{RB}^{(0)}+n+l \times \lceil N_{RB}^{S/N}{}_{S-REG}^{S-CCE} \rceil$, where $l=0, 1, \ldots, N_{S-REG}^{S-CCE}-1$ Example 38 includes the UE of any of Examples 31 to 37, wherein: S-CCEs corresponding to a S-PDCCH candidate m of a search space at aggregation level L is given by: L{m mod $\lfloor N_{S-CCE,k}/L \rfloor$}+i, wherein $i=0, \ldots, L-1, m=0, 1, \ldots M^{(L)}-1$ and $M^{(L)}$ is a number of S-PDCCH candidates to monitor at aggregation level L; or S-CCEs corresponding to a S-PDCCH candidate m of an S-PDCCH specific search space $SS_k^{(L)}$ is given by: L{($Y_k$+m)mod $\lfloor N_{S-CCE,k}/L \rfloor$}+i, wherein $i=0, \ldots L-1, m=0, 1, \ldots M^{(L)}-1$ and $M^{(L)}$ is a number of S-PDCCH candidates to monitor at aggregation level L in an S-TTI RB set, and $Y_k$ is defined by: $Y_k=(A \cdot Y_{k-1})$ mod D, wherein $Y_{-1}=n_{RNTI} \neq 0$, $A=39827$, $D=65537$, and k is an S-TTI index within the one or more subframes, wherein $N_{S-CCE,k}$ is a number of S-CCEs in a control region of the S-PDCCH in S-TTI k.

Example 39 includes the UE of any of Examples 31 to 38, wherein: the DCI format used to schedule a shortened physical downlink shared channel (S-PDSCH) and a shortened physical uplink shared channel (S-PUSCH) in the S-TTI in the one or more subframes is received on a legacy PDCCH region, and legacy PDCCH candidates are determined based on a dedicated cell radio network temporary identifier (C-RNTI) assigned by higher layers; or the DCI format used to schedule the S-PDSCH and the S-PUSCH in the S-TTI in the one or more subframes is received over the S-PDCCH in the S-TTI in the one or more subframes based on higher layers.

Example 40 includes the UE of any of Examples 31 to 39, wherein: the DCI format used to schedule a shortened physical downlink shared channel (S-PDSCH) and a shortened physical uplink shared channel (S-PUSCH) in the S-TTI in the one or more subframes is received on a legacy PDCCH region when the UE is configured with a cell-specific reference signal (CRS) for S-PDCCH demodulation; or the DCI format used to schedule the S-PDSCH and the S-PUSCH in the S-TTI in the one or more subframes is received over the S-PDCCH when the UE is not configured with CRS for S-PDCCH demodulation.

Example 41 includes the UE of any of Examples 31 to 40, wherein: a number of information bits in a DCI format used for a shortened physical downlink shared channel (S-PDSCH) is equal to a number of information bits in a DCI format used for shortened physical uplink shared channel (S-PUSCH) scheduling in a single S-TTI; and the DCI format used for the S-PDSCH and the DCI format used for the S-PUSCH scheduling are distinguished using a 1-bit flag information element (IE) that is included in each of the DCI format used for the S-PDSCH and the DCI format used for the S-PUSCH scheduling.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) operable to identify downlink control channel candidates for receiving downlink control information, the apparatus comprising:
   one or more processors configured to:
      decode a downlink control information (DCI) format received from an eNodeB, the DCI format indicating a set of resource blocks (RBs) in one or more subframes allocated for reception or transmission of data or control information in a shortened transmission time interval (S-TTI);
      identify a subset of resource elements (REs) within the set of RBs in the one or more subframes, wherein the subset of REs correspond to shortened physical downlink control channel (S-PDCCH) candidates in the S-TTI of the one or more subframes; and
      attempt to decode the S-PDCCH candidates in the S-TTI of the one or more subframes, wherein S-PD- CCH candidates that are successfully decoded cause the UE to identify the downlink control information; and memory configured to store the identified downlink control information.

2. The apparatus of claim 1, further comprising a transceiver configured to:
receive the DCI format from the eNodeB; and
receive the downlink control information from the eNodeB.

3. The apparatus of claim 1, wherein the DCI format includes:
time-frequency radio resource assignment information; and
one or more of a modulation and coding rate, a S-PDCCH control size or a reference signal (RS) type.

4. The apparatus of claim 1, wherein the DCI format is received on a legacy PDCCH region, and downlink control resources used for the DCI format are identified by: a dedicated radio network temporary identifier (RNTI) value assigned by higher layers, or a predefined value in a 1-bit information element (IE) field in the DCI format.

5. The apparatus of claim 1, wherein the one or more processors are further configured to:
determine, at the UE, a starting orthogonal frequency division multiplexing (OFDM) symbol and a number of OFDM symbols in one or more subframes used for an S-PDCCH transmission from the eNodeB;
identify a group of REs in the OFDM symbols to form one or more shortened resource element groups (S-REGs), wherein the group of REs in the OFDM symbol corresponds to the subset of REs within the set of RBs in the one or more subframes;
identify one or more S-TTI control channel elements (S-CCEs) from the one or more S-REGs; and
aggregate the one or more S-CCEs, wherein the S-PDCCH transmission is received from the eNodeB using the one or more aggregated S-CCEs.

6. The apparatus of claim 5, wherein:
the starting OFDM symbol used for the S-PDCCH transmission from the eNodeB is determined based on a number of OFDM symbols in the S-TTI or configured via higher layer signaling; and
the number of OFDM symbols used for the S-PDCCH transmission from the eNodeB is: signaled by the DCI format, or configured via higher layer signaling, or defined in a Third Generation Partnership Project (3GPP) Long-Term Evolution (LTE) specification, or dependent on a UE-specific S-TTI length that is configured by higher layers.

7. The apparatus of claim 5, wherein:
the S-CCE includes three S-REGs, and each S-REG includes all REs except REs carrying a demodulation reference signal (DMRS) within one physical resource block (PRB) in one OFDM symbol in an increasing order of frequency; or
the S-CCE includes two S-REGs, and each S-REG includes all REs except REs carrying a DMRS within one PRB in two consecutive OFDM symbols; or
the S-CCE includes six S-REGs, and each S-REG includes six REs.

8. The apparatus of claim 7, wherein:
one S-REG includes REs k within one OFDM symbol with k=$k_0$+0, $k_0$+1, . . . , $k_0$+5, wherein $k_0$ is a first RE in frequency index in a PRB; or
one S-REG includes REs k within one OFDM symbol with k=$k_0$+6, $k_0$+7, . . . , $k_0$+11,; or
one S-REG includes even REs k within one OFDM symbol with k=$k_0$+0, $k_0$+2, . . . , $k_0$+10; or
one S-REG includes odd REs k within one OFDM symbol with k=$k_0$+1, $k_0$+7, . . . , $k_0$+11.

9. The apparatus of claim 5, wherein the one or more processors are further configured to map a block of encoded DCI symbols to REs in the one or more S-REGs, wherein the REs are not utilized for a cell-specific reference signal (CRS), zero power (ZP) channel state information reference signal (CSI-RS) or nonzero power (NZP) CSI-RS.

10. The apparatus of claim 5, wherein:
a S-CCE number (n) corresponds to S-REGs in $N_{S\text{-}REG}^{S\text{-}CCE}$ consecutive physical resource block (PRB) indices starting from a PRB $N_{RB}^{(0)}$+n×$N_{S\text{-}REG}^{S\text{-}CCE}$, where $N_{RB}^{(0)}$ is a starting PRB within an allocated S-TTI PRB sets and $N_{S\text{-}REG}^{S\text{-}CCE}$ represents a number of S-REGs per S-CCE; or
a S-CCE number (n) corresponds to S-REGs in a PRB numbered with $N_{RB}^{(0)}$+n+j×$\lceil N_{RB}^{S}/N_{S\text{-}REG}^{S\text{-}CCE} \rceil$, where j=0, . . . , $N_{S\text{-}REG}^{S\text{-}CCE}$−1, and $N_{RB}^{S}$ is a total number of RBs for an allocated S-TTI PRB set; or
a S-CCE number (n) corresponds to S-REGs numbered (n mod $N_{S\text{-}REG}^{RB}$)+j$N_{S\text{-}REG}^{RB}$ in a PRB index (k+n×$N_{S\text{-}REG}^{S\text{-}CCE}/N_{S\text{-}REG}^{RB}$+$N_{RB}^{(0)}$); where k=0, 1, . . . , $N_{S\text{-}REG}^{S\text{-}CCE}/N_{S\text{-}REG}^{RB}$−1, and $N_{S\text{-}REG}^{RB}$ is a total number of S-REGs within a single RB; or
a S-CCE number (n) corresponds to S-REGs numbered (n mod $N_{S\text{-}REG}^{RB}$) in PRB indices $N_{RB}^{(0)}$+n+l×$\lceil N_{RB}^{S}/N_{S\text{-}REG}^{S\text{-}CCE} \rceil$, where l=0, 1, . . . , $N_{S\text{-}REG}^{S\text{-}CCE}$−1.

11. The apparatus of claim 10, wherein:
S-CCEs corresponding to a S-PDCCH candidate m of a search space at aggregation level L is given by: L{m mod $\lfloor N_{S\_CCE,k}/L \rfloor$}+i, wherein i=0, . . . , L−1, m=0, 1, . . . $M^{(L)}$−1, and $M^{(L)}$ is a number of S-PDCCH candidates to monitor at aggregation level L; or
S-CCEs corresponding to a S-PDCCH candidate m of an S-PDCCH specific search space $SS_k^{(L)}$ is given by: L{($Y_k$+m)mod $\lfloor N_{S\text{-}CCE,k}/L \rfloor$}+i, wherein i=0, . . . , L−1, m=0, 1, . . . $M^{(L)}$ is and $M^{(L)}$ is a number of S-PDCCH candidates to monitor at aggregation level L in an S-TTI RB set, and $Y_k$ is defined by: $Y_k$=(A·$Y_{k-1}$) mod D, wherein $Y_{-1}$=$n_{RNTI}$≠0, A=39827, D=65537, and k is an S-TTI index within the one or more subframes, wherein $N_{S\text{-}CCE,k}$ is a number of S-CCEs in a control region of the S-PDCCH in S-TTI k.

12. The apparatus of claim 1, wherein a number of aggregation levels (L) and a number of S-PDCCH candidates to monitor at a given aggregation level L is configured via higher layer signaling for the UE or dynamically configured by the DCI format transmitted to the UE in the one or more subframes.

13. The apparatus of claim 1, wherein:
a DCI format used to schedule a shortened physical downlink shared channel (S-PDSCH) and a shortened physical uplink shared channel (S-PUSCH) in the S-TTI in the one or more subframes is received on a legacy PDCCH region, and legacy PDCCH candidates are determined based on a dedicated cell radio network temporary identifier (C-RNTI) assigned by higher layers; or
a DCI format used to schedule the S-PDSCH and the S-PUSCH in the S-TTI in the one or more subframes is received over the S-PDCCH.

14. The apparatus of claim 1, wherein:
a DCI format used to schedule a shortened physical downlink shared channel (S-PDSCH) and a shortened physical uplink shared channel (S-PUSCH) in the S-TTI in the one or more subframes is received on a legacy PDCCH region when the UE is configured with a cell-specific reference signal (CRS) for S-PDCCH demodulation; or a DCI format used to schedule the S-PDSCH and the S-PUSCH in the S-TTI in the one or more subframes is received over the S-PDCCH when the UE is not configured with CRS for S-PDCCH demodulation.

15. The apparatus of claim 1, wherein:
a number of information bits in a DCI format used for a shortened physical downlink shared channel (S-PDSCH) is equal to a number of information bits in a DCI format used for shortened physical uplink shared channel (S-PUSCH) scheduling in a single S-TTI; and
a DCI format used for the S-PDSCH and the DCI format used for the S-PUSCH scheduling are distinguished using a 1-bit flag information element (IE) that is included in each of the DCI format used for the S-PDSCH and the DCI format used for the S-PUSCH scheduling.

16. An apparatus of an eNodeB operable to provide downlink control information, the apparatus comprising:
memory; and
one or more processors configured to:
encode a downlink control information (DCI) format for transmission to a user equipment (UE), the DCI format indicating a set of resource blocks (RBs) one or more subframes allocated for reception or transmission of data or control information in a shortened transmission time interval (S-TTI); and
encode the downlink control information for transmission to the UE, wherein a subset of resource elements (REs) within the set of RBs in the one or more subframes corresponds to shortened physical downlink control channel (S-PDCCH) candidates in the S-TTI of the one or more subframes, and the S-PDCCH candidates in the S-TTI of the one or more subframes correspond to the downlink control information.

17. The apparatus of claim 16, wherein the DCI format includes:
time-frequency radio resource assignment information; and
one or more of a modulation and coding rate, a S-PDCCH control size or a reference signal (RS) type.

18. The apparatus of claim 16, wherein the DCI format is transmitted on a legacy PDCCH region, and downlink control resources used for the DCI format are identified by:
a dedicated radio network temporary identifier (RNTI) value assigned by higher layers, or a predefined value in a 1-bit information element (IE) field in the DCI format.

19. The apparatus of claim 16, wherein a number of aggregation levels (L) and a number of S-PDCCH candidates for monitoring at a given aggregation level L is configured via higher layer signaling to the UE or dynamically configured by the DCI format transmitted to the UE in the one or more subframes.

20. At least one non-transitory machine readable storage medium having instructions embodied thereon for identifying downlink control channel candidates at a user equipment (UE) for receiving downlink control information from an eNodeB, the instructions when executed by one or more processors of the UE perform the following:
decoding, at the UE, a downlink control information (DCI) format received from an eNodeB, the DCI format indicating a set of resource blocks (RBs) in one or more subframes allocated for reception or transmission of data or control information in a shortened transmission time interval (S-TTI);
identifying, at the UE, a subset of resource elements (REs) within the set of RBs in the one or more subframes, and the subset of REs correspond to shortened physical downlink control channel (S-PDCCH) candidates in the S-TTI of the one or more subframes; and
attempting, at the UE, to decode the S-PDCCH candidates in the S-TTI of the one or more subframes, wherein S-PDCCH candidates that are successfully decoded cause the UE to identify the downlink control information.

21. The at least one non-transitory machine readable storage medium of claim 20, further comprising instructions when executed perform the following:
determining, at the UE, a starting orthogonal frequency division multiplexing (OFDM) symbol and a number of OFDM symbols in the one or more subframes used for an S-PDCCH transmission from the eNodeB;
identifying a group of REs in the OFDM symbols to form one or more shortened resource element groups (S-REGs), wherein the group of REs in the OFDM symbol corresponds to the subset of REs within the set of RBs in the one or more subframes;
identifying one or more S-TTI control channel elements (S-CCEs) from the one or more S-REGs; and
aggregating the one or more S-CCEs, wherein the S-PDCCH transmission is received from the eNodeB using the one or more aggregated S-CCEs.

22. The at least one non-transitory machine readable storage medium of claim 21, wherein:
the starting OFDM symbol used for the S-PDCCH transmission from the eNodeB is determined based on a number of OFDM symbols in the S-TTI or configured via higher layer signaling; and
the number of OFDM symbols used for the S-PDCCH transmission from the eNodeB is signaled by the DCI format or configured via higher layer signaling, and the number of OFDM symbols depends on a UE-specific S-TTI length.

23. The at least one non-transitory machine readable storage medium of claim 21, wherein:
the S-CCE includes three S-REGs, and each S-REG includes all REs except REs carrying a demodulation reference signal (DMRS) within one physical resource block (PRB) in one OFDM symbol in an increasing order of frequency; or
the S-CCE includes two S-REGs, and each S-REG includes all REs except REs carrying a DMRS within one PRB in two consecutive OFDM symbols; or
the S-CCE includes six S-REGs, and each S-REG includes six REs.

24. The at least one non-transitory machine readable storage medium of claim 23, wherein:
one S-REG includes REs k within one OFDM symbol with $k=k_0+0, k_0+1, \ldots, k_0+5$, wherein $k_0$ is a first RE in frequency index in a PRB; or
one S-REG includes REs k within one OFDM symbol with $k=k_0+6, k_0+7, \ldots, k_0+11$; or
one S-REG includes even REs k within one OFDM symbol with $k=k_0+0, k_0+2, \ldots, k_0+10$; or
one S-REG includes odd REs k within one OFDM symbol with $k=k_0+1, k_0+7, \ldots, k_0+11$.

25. The at least one non-transitory machine readable storage medium of claim 21, further comprising instructions when executed perform the following: mapping a block of encoded DCI symbols to REs in the one or more S-REGs, wherein the REs are not utilized for a cell-specific reference signal (CRS), zero power (ZP) channel state information reference signal (CSI-RS) or nonzero power (NZP) CSI-RS.

26. The at least one non-transitory machine readable storage medium of claim 21, wherein:
- a S-CCE number (n) corresponds to S-REGs in $N_{S\text{-}REG}^{S\text{-}CCE}$ consecutive physical resource block (PRB) indices starting from a PRB $N_{RB}^{(0)} \lfloor n \times N_{S\_REG}^{S\_CCE}$, where $N_{RB}^{(0)}$ is a starting PRB within an allocated S-TTI PRB sets and $N_{S\text{-}REG}^{S\text{-}CCE}$ represents a number of S-REGs per S-CCE; or
- a S-CCE number (n) corresponds to S-REGs in a PRB numbered with $N_{RB}^{(0)}+n+j\times \lceil N_{RB}^{S}/N_{S\text{-}REG}^{S\text{-}CCE}\rceil$, where $j=0, \ldots, N_{S\text{-}REG}^{S\text{-}CCE}-1$, and $N_{RB}^{S}$ is a total number of RBs for an allocated S-TTI PRB set; or
- a S-CCE number (n) corresponds to S-REGs numbered (n mod $N_{S\text{-}REG}^{RB})+jN_{S\text{-}REG}^{RB}$ in a PRB index ($k+n\times N_{S\text{-}REG}^{S\text{-}CCE}/N_{S\text{-}REG}^{RB}+N_{RB}^{(0)}$); where $k=0, 1, \ldots, N_{S\text{-}REG}^{S\text{-}CCE}/N_{S\text{-}REG}^{RB}-1$, and $N_{S\text{-}REG}^{RB}$ is a total number of S-REGs within a single RB; or
- a S-CCE number (n) corresponds to S-REGs numbered (n mod $N_{S\text{-}REG}^{RB}$) in PRB indices $N_{RB}^{(0)}+n+1\times \lceil N_{RB}^{S}/N_{S\text{-}REG}^{S\text{-}CCE}\rceil$, where $l=0, 1, \ldots, N_{S\text{-}REG}^{S\text{-}CCE}-1$.

27. The at least one non-transitory machine readable storage medium of claim 26, wherein:
- S-CCEs corresponding to a S-PDCCH candidate m of a search space at aggregation level L is given by: $L\{m \bmod \lfloor N_{S\text{-}CCE,k}/L \rfloor\}+i$, wherein $i=0, \ldots, L-1, m=0, 1, \ldots M^{(L)}-1$, and $M^{(L)}$ is a number of S-PDCCH candidates to monitor at aggregation level L; or
- S-CCEs corresponding to a S-PDCCH candidate m of an S-PDCCH specific search space $SS_k^{(L)}$ is given by: $L\{(Y_k+m) \bmod \lfloor N_{S\text{-}CCE,k}/L \rfloor\}+i$, wherein $i=0, \ldots, L-1, m=0, 1, \ldots M^{(L)}$ is and $M^{(L)}$ is a number of S-PDCCH candidates to monitor at aggregation level L in an S-TTI RB set, and $Y_k$ is defined by: $Y_k=(A \cdot Y_{k-1}) \bmod D$, wherein $Y_{-1}=n_{RNTI}\neq 0$, $A=39827$, $D=65537$, and k is an S-TTI index within the one or more subframes, wherein $N_{S\text{-}CCE,k}$ is a number of S-CCEs in a control region of the S-PDCCH in S-TTI k.

28. The at least one non-transitory machine readable storage medium of claim 20, wherein:
- a DCI format used to schedule a shortened physical downlink shared channel (S-PDSCH) and a shortened physical uplink shared channel (S-PUSCH) in the S-TTI in the one or more subframes is received on a legacy PDCCH region, and legacy PDCCH candidates are determined based on a dedicated cell radio network temporary identifier (C-RNTI) assigned by higher layers; or
- a DCI format used to schedule the S-PDSCH and the S-PUSCH in the S-TTI in the one or more subframes is received over the S-PDCCH in the S-TTI in the one or more subframes based on higher layers.

29. The at least one non-transitory machine readable storage medium of claim 20, wherein:
- a DCI format used to schedule a shortened physical downlink shared channel (S-PDSCH) and a shortened physical uplink shared channel (S-PUSCH) in the S-TTI in the one or more subframes is received on a legacy PDCCH region when the UE is configured with a cell-specific reference signal (CRS) for S-PDCCH demodulation; or
- a DCI format used to schedule the S-PDSCH and the S-PUSCH in the S-TTI in the one or more subframes is received over the S-PDCCH when the UE is not configured with CRS for S-PDCCH demodulation.

30. The at least one non-transitory machine readable storage medium of claim 20, wherein:
- a number of information bits in a DCI format used for a shortened physical downlink shared channel (S-PDSCH) is equal to a number of information bits in a DCI format used for shortened physical uplink shared channel (S-PUSCH) scheduling in a single S-TTI; and
- a DCI format used for the S-PDSCH and the DCI format used for the S-PUSCH scheduling are distinguished using a 1-bit flag information element (IE) that is included in each of the DCI format used for the S-PDSCH and the DCI format used for the S-PUSCH scheduling.

* * * * *